(12) United States Patent
Zhong

(10) Patent No.: US 12,464,329 B2
(45) Date of Patent: Nov. 4, 2025

(54) TRANSPORTATION MEANS CONTROL METHOD AND ELECTRONIC DEVICE

(71) Applicant: HUAWEI TECHNOLOGIES CO., LTD., Guangdong (CN)

(72) Inventor: Feng Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 18/250,974

(22) PCT Filed: Sep. 3, 2021

(86) PCT No.: PCT/CN2021/116510
§ 371 (c)(1),
(2) Date: Apr. 27, 2023

(87) PCT Pub. No.: WO2022/088990
PCT Pub. Date: May 5, 2022

(65) Prior Publication Data
US 2023/0379676 A1    Nov. 23, 2023

(30) Foreign Application Priority Data
Oct. 30, 2020    (CN) .......................... 202011193866.0

(51) Int. Cl.
*H04W 4/48* (2018.01)
*H04W 4/80* (2018.01)
(Continued)

(52) U.S. Cl.
CPC ............... *H04W 4/48* (2018.02); *H04W 4/80* (2018.02); *H04W 8/005* (2013.01); *H04W 76/14* (2018.02)

(58) Field of Classification Search
CPC ......... H04W 4/48; H04W 4/80; H04W 8/005; H04W 76/14; H04W 52/245;
(Continued)

(56) References Cited

U.S. PATENT DOCUMENTS 8,571,725 B2 * 10/2013 Juzswik ................ B60R 25/245
701/2
8,818,569 B2 * 8/2014 Oakes ................ B60C 23/0438
701/2
(Continued)

*Primary Examiner* — Santiago Garcia

(57) ABSTRACT

An electronic device is located in a transportation means and includes an ECU, a first and a second short-distance wireless communication module, wherein between which a distance is a first distance. When no interference, the second short-distance wireless communication module receives a first message broadcast by the first short-distance wireless communication module. When interference, the second short-distance wireless communication module does not receive the first message, and sends a notification message to the ECU; and the ECU indicates the first short-distance wireless communication module to increase a transmit power until the second short-distance wireless communication module receives the first message. Therefore, the first message can be received only when a distance between a mobile device and the transportation means is less than or equal to the first distance, so as to send a first response message, so that the electronic device controls the transportation means to perform a specific function.

19 Claims, 13 Drawing Sheets

(51) Int. Cl.
*H04W 8/00* (2009.01)
*H04W 76/14* (2018.01)

(58) Field of Classification Search
CPC ....... H04W 64/00; H04W 4/023; H04W 4/40; H04W 12/50; H04W 52/383; H04W 84/12; H04W 84/18; H04W 88/06; H04W 4/06; H04W 12/06; G07C 2209/63; G07C 9/00309; Y02D 30/70
See application file for complete search history.

(56) References Cited

U.S. PATENT DOCUMENTS

| | | | |
|---|---|---|---|
| 8,983,534 B2* | 3/2015 | Patel | G07C 9/00174 340/5.72 |
| 9,008,641 B2* | 4/2015 | Yang | H04M 1/72463 455/418 |
| 9,533,654 B2* | 1/2017 | Talty | G07C 9/00309 |
| 9,536,364 B2* | 1/2017 | Talty | E05B 19/0082 |
| 10,035,494 B2* | 7/2018 | Sute | G07C 9/00174 |
| 2014/0240091 A1* | 8/2014 | Talty | B60R 25/245 340/5.62 |
| 2016/0063786 A1* | 3/2016 | Lewis | B60R 25/24 340/5.72 |
| 2016/0100310 A1* | 4/2016 | Lee | H04W 52/04 713/171 |
| 2018/0154866 A1* | 6/2018 | Sute | H02J 50/12 |
| 2019/0202444 A1* | 7/2019 | Golgiri | H04W 4/40 |
| 2019/0274018 A1* | 9/2019 | Mosenia | G06F 8/65 |
| 2021/0099243 A1* | 4/2021 | Kretschmar | H04B 17/14 |

* cited by examiner

TRANSPORTATION MEANS CONTROL METHOD AND ELECTRONIC DEVICE

CROSS-REFERENCE TO RELATED APPLICATIONS

This application is a National Stage of International Application No. PCT/CN2021/116510 filed on Sep. 3, 2021, which claims priority to Chinese Patent Application No. 202011193866.0 filed on Oct. 30, 2020. Both of the aforementioned applications are hereby incorporated by reference in their entireties.

TECHNICAL FIELD

This disclosure relates to the control field, and in particular, to a transportation means control method and an electronic device.

BACKGROUND

When a user carrying a mobile device approaches a transportation means such as a vehicle to a specific distance away from the vehicle from far to near, a specific function (for example, unlocking a vehicle door) can be conveniently and quickly performed without any operation of the user during the entire process. Generally, the vehicle door is automatically unlocked only when a distance between the mobile device and the vehicle door is within a security distance (for example, 2 meters), to implement secure unlocking and avoid a security risk. However, for example, when the distance between the mobile device and the vehicle door is calculated or obtained based on a value of a received signal strength indication (Received Signal Strength Indication, RSSI), a large error is generated, and a large security risk is caused in a case of interference. Therefore, it is required to resolve the problem about how to accurately identify a distance between the mobile device and the transportation means, and reduce or even avoid an error in a case of interference, so as to automatically, safely, and accurately perform a specific function of the transportation means.

SUMMARY

To resolve the foregoing technical problem in the conventional technology, this disclosure provides a transportation means control method, an electronic device, and a computer-readable storage medium, so that when there is interference, a distance between a mobile device and a transportation means can be accurately identified, and an error can be reduced or even avoided. Therefore, a specific function of the transportation means can be automatically, safely, and accurately performed only after the distance between the mobile device and the transportation means is within a security distance.

According to a first aspect, this disclosure provides an electronic device. The electronic device includes: a processor; a memory, where the memory is coupled to the processor; a first short-distance wireless communication module, where the first short-distance wireless communication module is connected to the processor, the first short-distance wireless communication module is fixedly disposed on a first surface of a transportation means, and the first short-distance wireless communication module broadcasts a first message at a first transmit power based on a first periodicity; a second short-distance wireless communication module, where the second short-distance wireless communication module is connected to the processor, the second short-distance wireless communication module is fixedly disposed on a second surface of the transportation means, the first surface and the second surface are different surfaces of the transportation means, the first short-distance wireless communication module is at a first distance from the second short-distance wireless communication module, the second short-distance wireless communication module listens to the first message based on a second periodicity, and the second short-distance wireless communication module receives the first message within the second periodicity; and a computer program, where the computer program is stored in the memory, and when the computer program is executed by the processor, the electronic device is enabled to perform the following steps.

After the second short-distance wireless communication module does not receive the first message within the second periodicity, a first notification message is sent to the processor by using the second short-distance wireless communication module; after receiving the first notification message, the processor indicates the first short-distance wireless communication module to increase a transmit power until the second short-distance wireless communication module receives the first message within the second periodicity; the first short-distance wireless communication module receives a first response message of a mobile device; and in response to the first response message, the processor indicates the transportation means to perform a specific function, where the second periodicity is greater than or equal to the first periodicity, and the first response message is a response message of the mobile device for the first message.

It should be noted that, for example, the transportation means is a vehicle, and the first surface or the second surface of the transportation means may be a head of the vehicle, a left side door of the vehicle, a right side door of the vehicle, a tail of the vehicle, or the like. The first surface and the second surface may be two opposite surfaces. For example, the first surface is the head of the vehicle, and the second surface is the tail of the vehicle. The first surface is the left side door of the vehicle, and the second surface is the right side door of the vehicle. The first surface and the second surface may alternatively be two adjacent surfaces, and may be disposed based on a requirement.

According to the foregoing method, in a manner in which the second short-distance wireless communication module determines that the first message cannot be received within the second periodicity, it may be determined that a current transmission distance of the first short-distance wireless communication module does not meet a requirement for performing the specific function of the transportation means, interference may exist near the first short-distance wireless communication module, and the first notification message is sent to the processor by using the second short-distance wireless communication module. In this way, the processor indicates the first short-distance wireless communication module to increase the transmit power of the first short-distance wireless communication module, and when the second short-distance wireless communication module receives the first message of the first short-distance wireless communication module, it is determined that a distance of the first message broadcast by the first short-distance wireless communication module is at least the first distance. Therefore, it is ensured that when the mobile device approaches the transportation means, it is determined, by using a method of receiving the first message broadcast by the first short-distance wireless communication module, that the distance between the mobile device and the transportation means is within the security distance. A transmission distance of the first short-distance wireless communication module is at least the first distance, to ensure that when the mobile device approaches the transportation means, the distance between the mobile device and the transportation means is within the security distance by using the method of receiving the first message broadcast by the first short-distance wireless communication module, so that the electronic device can effectively resist interference caused by a signal in an environment to a signal of a communication module 1. In this way, when there is interference, the distance between the mobile device and the transportation means is accurately identified, and the error is reduced or even avoided, so that the specific function of the transportation means is automatically, safely, and accurately performed, security and sensitivity of performing the specific function of the transportation means are improved, and user experience is improved.

According to the first aspect, the electronic device further includes a third short-distance wireless communication module fixedly disposed in the transportation means, the first short-distance wireless communication module is at a second distance from the third short-distance wireless communication module, and the second distance is greater than the first distance. Before the first short-distance wireless communication module receives the first response message of the mobile device, the electronic device further performs the following steps: After the third short-distance wireless communication module receives the first message within a third periodicity, a second notification message is sent to the processor by using the third short-distance wireless communication module; and after receiving the second notification message, the processor indicates the first short-distance wireless communication module to reduce the transmit power until the third short-distance wireless communication module does not receive the first message within the third periodicity, where the third periodicity is greater than or equal to the first periodicity.

According to the foregoing method, when it is determined that the third short-distance wireless communication module receives the first message within the third periodicity, it may be determined that the transmission distance of the first short-distance wireless communication module is greater than the second distance by using the third short-distance wireless communication module, and the transmit power of the first short-distance wireless communication module needs to be reduced. When it is determined that the third short-distance wireless communication module does not receive the first message within the third periodicity, it may be determined that the transmission distance of the first short-distance wireless communication module is less than the second distance by using the third short-distance wireless communication module, that is, it may be ensured that the transmission distance of the first short-distance wireless communication module is not greater than a maximum value of the security distance of a security condition within which the mobile device triggers execution of the specific function of the transportation means. In this way, when interference of an environment in which the electronic device is located changes, for example, the interference is weakened or the interference disappears, the distance of the first message is not greater than the second distance, that is, the distance of the first message does not exceed a maximum value of a required security distance, so that it is ensured that when the mobile device approaches the transportation means, the distance between the mobile device and the transportation means is within the maximum value of the security distance by using the method of receiving the first message broadcast by the first short-distance wireless communication module. This improves an anti-interference capability of the first short-distance wireless communication module in identifying the distance between the mobile device and the transportation means.

According to any one of the first aspect or the implementations of the first aspect, before the first short-distance wireless communication module receives the first response message of the mobile device, the electronic device further performs the following steps: after the second short-distance wireless communication module receives the first message within the second periodicity, comparing signal strength of the received first message with preset signal strength, where the preset signal strength is signal strength of the first message received by the second short-distance wireless communication module when there is no interference and when the first short-distance wireless communication module transmits at the first transmit power; the second short-distance wireless communication module sends a third notification message to the processor after the signal strength of the received first message is greater than the preset signal strength; and after receiving the third notification message, the processor indicates the first short-distance wireless communication module to reduce the transmit power until the signal strength of the received first message is equal to the preset signal strength.

According to the foregoing method, in a scenario in which interference disappears, the transmit power corresponding to the first short-distance wireless communication module when there is no interference can be restored, so that the second short-distance wireless communication module can determine that the distance of the first message broadcast by the first short-distance wireless communication module meets the security condition. This improves an anti-interference capability of the first short-distance wireless communication module in identifying the distance between the mobile device and the transportation means.

In another possible implementation, the second short-distance wireless communication module may compare the signal strength of the first message with signal strength of the first message received by the second short-distance wireless communication module in a non-interference environment, or with signal strength of the first message received by the second short-distance wireless communication module in a test environment. A preset value is preset based on a correspondence between the signal strength of the first message received by the second short-distance wireless communication module and the transmission distance of the first short-distance wireless communication module. In this way, when the signal strength of the first message received by the second short-distance wireless communication module is greater than the preset value, it may be determined that the current transmission distance of the first short-distance wireless communication module is excessively large, and exceeds the security distance of the security condition within which the mobile device triggers execution of the specific function of the transportation means. This may cause a security risk. Therefore, the second short-distance wireless communication module sends the third notification message to the processor, so that the processor sends a third control instruction to the first short-distance wireless communication module based on the third notification message, to reduce the transmit power of the first short-distance wireless communication module. In this way, in a scenario in which interference disappears or interference is weakened, the distance of the first message broadcast by the first short-distance wireless communication module meets a requirement of the security distance, and an anti-interference capability of identifying the distance between the mobile device and the transportation means by the first short-distance wireless communication module is improved.

According to any one of the first aspect or the implementations of the first aspect, the electronic device further includes a fourth short-distance wireless communication module, and a distance of a second message broadcast by the fourth short-distance wireless communication module is greater than the first distance. Before the first short-distance wireless communication module broadcasts the first message at the first transmit power based on the first periodicity, the electronic device further performs the following steps: broadcasting, by using the fourth short-distance wireless communication module, a second message; receiving a pairing request message of the mobile device; and in response to the pairing request message, broadcasting, by using the fourth short-distance wireless communication module, a pairing response message to the mobile device, to complete pairing with the mobile device.

According to the foregoing method, before the mobile device triggers execution of the specific function of the transportation means, a communication connection between the mobile device and the electronic device may be first established in a pairing manner, so that a user does not need to actively initiate, by using the mobile device, an operation of triggering execution of the specific function of the transportation means, but triggers execution of the specific function of the transportation means without sensing by using the mobile device. In this way, user experience is improved.

According to any one of the first aspect, or the foregoing implementations of the first aspect, a distance of the second message broadcast by the fourth communication module is greater than a distance of the first message broadcast by the first short-distance wireless communication module.

According to the foregoing method, when the mobile device is not within the security distance for triggering execution of the specific function of the transportation means, the communication connection between the mobile device and the electronic device may be established, so that time is reserved for subsequently adjusting the transmit power of the first short-distance wireless communication module by using the first short-distance wireless communication module, and flexibility of the implementation solution is improved.

According to any one of the first aspect or the implementations of the first aspect, the fourth short-distance wireless communication module is the first short-distance wireless communication module.

In a process in which the mobile device and the electronic device perform pairing or authentication for the first time, a pairing or authentication process may be completed based on the first short-distance wireless communication module when the mobile device is close to the electronic device, so that interference of another signal to the pairing or authentication process can be effectively avoided, and security is improved.

According to any one of the first aspect or the implementations of the first aspect, before the electronic device broadcasts the first message based on the first periodicity, the electronic device further performs the following steps: obtaining a digital key, where the digital key is used to verify permission of the mobile device to control the transportation means to perform the specific function; and receiving an authentication request message sent by the mobile device, where the authentication request message carries authentication information, and the authentication information is generated based on the digital key; in response to the authentication request message, performing authentication on the authentication request message, to obtain an authentication response message; and sending the authentication response message to the mobile device, where the authentication response message is used to notify the mobile device of obtaining permission for controlling the transportation means to perform the specific function.

According to the foregoing method, authentication may be performed on the permission of the mobile device to control the transportation means to perform the specific function. Therefore, security of controlling, by the mobile device, the transportation means to perform the specific function is improved. It should be noted that the electronic device may receive the authentication request message sent by the mobile device in a plurality of manners. For example, the second message sent by the fourth communication module may be received after the communication connection to the mobile device is established. In this way, it is ensured that the mobile device has completed authentication within the security distance, and the electronic device can be smoothly triggered, by using the first response message sent by the mobile device, to control the transportation means to perform the specific function, so that user experience is improved.

According to any one of the first aspect or the foregoing implementations of the first aspect, before the electronic device broadcasts the first message based on the first periodicity, the electronic device further performs the following steps: receiving, by using the fourth communication module, an authentication request message sent by the mobile device, where the authentication request message carries authentication information, and the authentication information is generated based on the digital key; in response to the authentication request message, forwarding the authentication request message to a server; and receiving an authentication response message from the server, and forwarding the authentication response message to the electronic device, where the authentication response message is used to notify the mobile device of obtaining permission for controlling the transportation means to perform the specific function.

According to the foregoing method, the electronic device may not need to store the digital key and perform authentication on the authentication request message, but performs authentication by using the server. This can adapt to more scenarios, improve authentication flexibility, and reduce power consumption and storage space overheads of the electronic device.

According to any one of the first aspect or the implementations of the first aspect, the first message includes an identifier of the first short-distance wireless communication module, the second message includes an identifier of a fourth communication module of the electronic device, the pairing request message includes verification information of the mobile device and the identifier of the fourth communication module, the pairing response message includes security code used for pairing with the mobile device and the identifier of the fourth communication module of the electronic device, the first short-distance wireless communication module, the third short-distance wireless communication module, and the fourth communication module establish a connection to the mobile device through any one of wireless fidelity Wi-Fi, Bluetooth, and ZigBee.

According to the foregoing method, the electronic device may be connected to the mobile device in a plurality of manners, so that flexibility and an application scope of the transportation means control method are improved.

According to any one of the first aspect or the foregoing implementations of the first aspect, a timing start point of the first periodicity, the second periodicity, and the third periodicity may be a time point such as a time point at which a transportation means is stalled or a vehicle door is locked.

According to a second aspect, this disclosure provides a transportation means control method, applied to an electronic device, where the electronic device is located in a transportation means, the electronic device includes: a processor; a memory coupled to the processor; a first short-distance wireless communication module connected to the processor, where the first short-distance wireless communication module is fixedly disposed on a first surface of the transportation means; and a second short-distance wireless communication module connected to the processor, where the second short-distance wireless communication module is fixedly disposed on a second surface of the transportation means, the first short-distance wireless communication module broadcasts a first message at a first transmit power based on a first periodicity, the first short-distance wireless communication module is at a first distance from the second short-distance wireless communication module, the second short-distance wireless communication module listens to the first message based on a second periodicity, and the second short-distance wireless communication module receives the first message within the second periodicity; and the method includes: The first short-distance wireless communication module broadcasts the first message based on the first periodicity, where the first message includes an identifier of the first short-distance wireless communication module, the second short-distance wireless communication module receives the first message within the second periodicity, and the second periodicity is greater than or equal to the first periodicity; the first short-distance wireless communication module receives a first response message from the mobile device, where the first response message includes the identifier of the first short-distance wireless communication module; and the processor sends an execution command of a specific function to the transportation means in response to the first response message, where the execution command is used to indicate the transportation means to perform the specific function.

According to the second aspect, the electronic device further includes a third short-distance wireless communication module fixedly disposed in the transportation means, the first short-distance wireless communication module is at a second distance from the third short-distance wireless communication module, the second distance is greater than the first distance, and before the first short-distance wireless communication module receives the first response message from the mobile device, the method further includes: After the third short-distance wireless communication module receives the first message within a third periodicity, the third short-distance wireless communication module sends a second notification message to the processor; and after receiving the second notification message, the processor indicates the first short-distance wireless communication module to reduce a transmit power until the third short-distance wireless communication module does not receive the first message within the third periodicity, where the third periodicity is greater than or equal to the first periodicity.

According to any one of the second aspect or the implementations of the second aspect, before the first short-distance wireless communication module receives the first response message of the mobile device, the method further includes: after the second short-distance wireless communication module receives the first message within the second periodicity, comparing signal strength of the received first message with preset signal strength, where the preset signal strength is signal strength of the first message received by the second short-distance wireless communication module when there is no interference and when the first short-distance wireless communication module transmits at the first transmit power; the second short-distance wireless communication module sends a third notification message to the processor after the signal strength of the received first message is greater than the preset signal strength; and after receiving the third notification message, the processor indicates the first short-distance wireless communication module to reduce the transmit power until the signal strength of the received first message is equal to the preset signal strength.

According to any one of the second aspect or the implementations of the second aspect, the electronic device further includes a fourth short-distance wireless communication module, and before the first short-distance wireless communication module broadcasts the first message at the first transmit power based on the first periodicity, the method further includes: broadcasting, by using the fourth short-distance wireless communication module, a second message; receiving a pairing request message of the mobile device; and in response to the pairing request message, broadcasting, by using the fourth short-distance wireless communication module, a pairing response message to the mobile device, to complete pairing with the mobile device.

According to any one of the second aspect or the implementations of the second aspect, before the first short-distance wireless communication module broadcasts the first message at the first transmit power based on the first periodicity, the method further includes: receiving an authentication request message of the mobile device, where the authentication request message includes a digital key, and the digital key is used to verify permission of the mobile device to control the transportation means to perform the specific function; and in response to the authentication request message, broadcasting, by using the fourth short-distance wireless communication module, an authentication response message to the mobile device, to complete authentication on the mobile device.

According to any one of the second aspect or the implementations of the second aspect, before the electronic device broadcasts the first message based on the first periodicity, the method further includes: receiving, by using the fourth communication module, an authentication request message sent by the mobile device, where the authentication request message carries authentication information, and the authentication information is generated based on the digital key; in response to the authentication request message, forwarding the authentication request message to a server; and receiving an authentication response message from the server, and forwarding the authentication response message to the electronic device, where the authentication response message is used to notify the mobile device of obtaining permission for controlling the transportation means to perform the specific function.

According to any one of the second aspect or the implementations of the second aspect, a distance of the second message broadcast by the fourth short-distance wireless communication module is greater than a distance of the first message broadcast by the first short-distance wireless communication module, or the fourth short-distance wireless communication module is the first short-distance wireless communication module.

For technical effects that can be achieved in any one of the implementations of the second aspect, refer to descriptions of technical effects that can be achieved in the possible implementations of the first aspect. Details are not described herein again.

According to a third aspect, a mobile device is provided. The mobile device communicates with the electronic device in any one of the first aspect or the implementations of the first aspect in a wireless manner, and the mobile device includes a processor, a memory, a communication interface, and a computer program, where the computer program is stored in the memory, and when the computer program is executed by the processor, the mobile device performs the following steps: receiving, when the mobile device is located at a first distance from a transportation means, a first message broadcast by the electronic device based on a first periodicity; and sending a first response message to the electronic device in response to the first message, where the first response message is used to indicate the electronic device to send an execution command of a specific function to the transportation means, and the execution command is used to indicate the transportation means to perform the specific function.

According to the foregoing method, the mobile device may confirm, based on the received first message of the first short-distance wireless communication module, that the mobile device has entered a security distance within which the mobile device triggers execution of the specific function of the transportation means, and thus may send the first response message to the electronic device by using an identifier of the first short-distance wireless communication module carried in the first message. Therefore, when receiving the first response message sent by the mobile device, the electronic device determines that the mobile device has entered the security distance within which the mobile device triggers the execution of the specific function of the transportation means, and may send the execution command of the specific function to the transportation means, to execute the specific function of the transportation means. According to the method, a distance between the mobile device and the transportation means does not need to be additionally positioned, and the distance between the mobile device and the transportation means is positioned in combination with a manner of establishing a communication connection to the electronic device, so that overheads of triggering, by the mobile device, the execution of the specific function of the transportation means are reduced, and efficiency of triggering, by the mobile device, the execution of the specific function of the transportation means is improved.

According to the third aspect, the first message includes an identifier of the first short-distance wireless communication module, and the first response message includes the identifier of the first short-distance wireless communication module.

According to any one of the third aspect or the implementations of the third aspect, the mobile device further includes a display, and further performs the following steps: receiving a prompt message sent by the electronic device, where the prompt message is used to prompt the transportation means to perform the specific function; and displaying the prompt message on the display in response to the prompt message.

According to the foregoing method, a message indicating that the specific function has been executed is displayed on the mobile device, so that the user knows a status of the controlled transportation means, and experience of the user in triggering execution of the specific function of the transportation means by using the mobile device is improved.

According to any one of the third aspect or the implementations of the third aspect, before the mobile device receives the first message broadcast by the electronic device based on the first periodicity, the mobile device further performs the following steps: receiving a second message broadcast by the electronic device, where the second message includes an identifier of a fourth communication module of the electronic device; and sending a pairing request message to the fourth communication module in response to the second message, where the pairing request message includes verification information of the mobile device and the identifier of the fourth communication module; receiving a pairing response message broadcast by the electronic device, where the pairing response message includes security code generated by the electronic device for pairing the mobile device with the electronic device and the identifier of the fourth communication module of the electronic device; and in response to the pairing response message, completing pairing with the electronic device by using the fourth communication module.

According to the foregoing method, before the mobile device triggers execution of the specific function of the transportation means, a communication connection between the mobile device and the electronic device may be first established in a pairing manner, so that a user does not need to actively initiate, by using the mobile device, an operation of triggering execution of the specific function of the transportation means, but triggers execution of the specific function of the transportation means without sensing by using the mobile device. In this way, user experience is improved.

According to any one of the third aspect or the implementations of the third aspect, a distance of the second message broadcast by the fourth short-distance wireless communication module is greater than a distance of the first message broadcast by the first short-distance wireless communication module.

According to the foregoing method, the mobile device can complete pairing with the electronic device in advance, to receive the first message for the mobile device subsequently, and initiate the first response message in response to the first message, to trigger execution of the specific function of the transportation means, so as to provide more sufficient time and reduce a requirement on computing power of the mobile device.

According to any one of the third aspect or the implementations of the third aspect, the fourth short-distance wireless communication module is the first short-distance wireless communication module; or the fourth short-distance wireless communication module is different from the first short-distance wireless communication module.

In a process in which the mobile device and the electronic device perform pairing or authentication for the first time, a pairing or authentication process may be completed based on the first short-distance wireless communication module when the mobile device is close to the electronic device, so that interference of another signal to the pairing or authentication process can be effectively avoided, and security is improved.

According to any one of the third aspect or the implementations of the third aspect, before receiving the first message broadcast by the electronic device based on the first periodicity, the mobile device further performs the following steps: obtaining a digital key, where the digital key is used to verify permission of the mobile device to control the transportation means to perform the specific function; sending an authentication request message to the electronic device, where the authentication request message carries authentication information, and the authentication information is generated based on the digital key; receiving an authentication response message from the electronic device; determining, in response to the authentication response message, that the mobile device obtains the permission to control the transportation means to perform the specific function.

According to the foregoing method, authentication may be performed on the permission of the mobile device to control the transportation means to perform the specific function, so that security of controlling, by the mobile device, the transportation means to perform the specific function is improved.

According to any one of the third aspect or the implementations of the third aspect, the mobile device further includes a display, and further performs the following steps: receiving a prompt message sent by the electronic device, where the prompt message is used to prompt that the mobile device is successfully paired with the electronic device; and displaying the prompt message on the display in response to the prompt message.

The message indicating the pairing is performed is displayed on the mobile device, so that the user knows a status of the controlled transportation means, and experience of the user in triggering execution of the specific function of the transportation means by using the mobile device is improved.

According to a fourth aspect, a transportation means control method is provided. The method is applied to a mobile device, and the mobile device performs wireless communication with the electronic device according to any one of the first aspect and the implementations of the first aspect. The method includes: when the mobile device is located within a first distance from a transportation means, receiving a first message broadcast by the electronic device based on a first periodicity, where the first message includes an identifier of a first short-distance wireless communication module; and sending a first response message to the electronic device, where the first response message includes the identifier of the first short-distance wireless communication module, the first response message is used to indicate the electronic device to send an execution command of a specific function to the transportation means, and the execution command is used to indicate the transportation means to perform the specific function.

According to the fourth aspect, the mobile device further includes a display, and the method further includes: receiving a prompt message sent by the electronic device, where the prompt message is used to prompt the transportation means to perform the specific function; and displaying the prompt message on the display in response to the prompt message.

According to any one of the fourth aspect or the implementations of the fourth aspect, before the mobile device receives the first message broadcast by the electronic device based on the first periodicity, the method further includes: receiving a second message broadcast by the electronic device, where the second message includes an identifier of a fourth communication module of the electronic device; and sending a pairing request message to the fourth communication module in response to the second message, where the pairing request message includes verification information of the mobile device and the identifier of the fourth communication module; receiving a pairing response message broadcast by the electronic device, where the pairing response message includes security code generated by the electronic device for pairing the mobile device with the electronic device and the identifier of the fourth communication module of the electronic device; and in response to the pairing response message, completing pairing with the electronic device by using the fourth communication module.

According to any one of the fourth aspect or the implementations of the fourth aspect, a distance of the second message broadcast by the fourth communication module is greater than the first distance.

According to any one of the fourth aspect or the implementations of the fourth aspect, before the mobile device receives the first message broadcast by the electronic device based on the first periodicity, the method further includes: obtaining a digital key, where the digital key is used to verify permission of the mobile device to control the transportation means to perform the specific function; sending an authentication request message to the electronic device, where the authentication request message carries authentication information, and the authentication information is generated based on the digital key; receiving an authentication response message from the electronic device; and determining, in response to the authentication response message, that the mobile device obtains the permission to control the transportation means to perform the specific function.

According to any one of the fourth aspect or the implementations of the fourth aspect, the mobile device further includes a display, and the method further includes: receiving a prompt message sent by the electronic device, where the prompt message is used to prompt that the mobile device is successfully paired with the electronic device; and displaying the prompt message on the display in response to the prompt message.

According to any one of the fourth aspect or the implementations of the fourth aspect, the first message includes an identifier of the first short-distance wireless communication module, the second message includes an identifier of a fourth communication module of the electronic device, the pairing request message includes verification information of the mobile device and the identifier of the fourth communication module, and the pairing response message includes security code used for pairing with the mobile device and the identifier of the fourth communication module of the electronic device. The first short-distance wireless communication module, the third short-distance wireless communication module, and the fourth communication module establish a connection to the mobile device through any one of wireless fidelity Wi-Fi, Bluetooth, and ZigBee.

For technical effects that can be achieved in any one of the implementations of the fourth aspect, refer to technical effects that can be achieved in the possible implementations of the third aspect. Details are not described herein again.

According to a fifth aspect, a transportation means control method is provided, and is applied to a transportation means control system. The system includes at least one mobile device and one electronic device. The electronic device includes: a processor; a memory, where the memory is coupled to the processor; a first short-distance wireless communication module, where the first short-distance wireless communication module is connected to the processor, and the first short-distance wireless communication module is fixedly disposed on a first surface of a transportation means, and the first short-distance wireless communication module broadcasts a first message at a first transmit power based on a first periodicity; a second short-distance wireless communication module, where the second short-distance wireless communication module is connected to the processor, and the second short-distance wireless communication module is fixedly disposed on a second surface of the transportation means, the first surface and the second surface are different surfaces of the transportation means, the first short-distance wireless communication module is at a first distance from the second short-distance wireless communication module, the second short-distance wireless communication module listens to the first message based on a second periodicity, and the second short-distance wireless communication module receives the first message within the second periodicity; a computer program, where the computer program is stored in the memory, and when the computer program is executed by the processor, the electronic device performs the following steps: After the second short-distance wireless communication module does not receive the first message within the second periodicity, the second short-distance wireless communication module sends a first notification message to the processor; and after receiving the first notification message, the processor indicates the first short-distance wireless communication module to increase a transmit power until the second short-distance wireless communication module receives the first message within the second periodicity; the first short-distance wireless communication module receives a first response message of the mobile device; and in response to the first response message, the processor indicates the transportation means to perform a specific function, where the second periodicity is greater than or equal to the first periodicity, and the first response message is a response message of the mobile device for the first message.

The mobile device includes a processor, a memory, a communication interface, and a computer program, where the computer program is stored in the memory, and when the computer program is executed by the processor, the electronic device performs the following steps: receiving, when the mobile device is located at a first distance from the transportation means, a first message broadcast by the electronic device based on a first periodicity, where the first message includes an identifier of the first short-distance wireless communication module; and sending a first response message to the electronic device, where the first response message is used to indicate the processor to send an execution command of a specific function to the transportation means, and the execution command is used to indicate the transportation means to perform the specific function.

According to the fifth aspect, the electronic device further includes a third short-distance wireless communication module fixedly disposed in the transportation means, the first short-distance wireless communication module is at a second distance from the third short-distance wireless communication module, the second distance is greater than the first distance, and before the first short-distance wireless communication module receives the first response message of the mobile device, the electronic device further performs the following steps: After the third short-di stance wireless communication module receives the first message within a third periodicity, the third short-distance wireless communication module sends a second notification message to the processor; and after receiving the second notification message, the processor indicates the first short-distance wireless communication module to reduce a transmit power until the third short-distance wireless communication module does not receive the first message within the third periodicity, where the third periodicity is greater than or equal to the first periodicity.

According to any one of the fifth aspect or the implementations of the fifth aspect, before the first short-distance wireless communication module receives the first response message of the mobile device, the electronic device further performs the following steps: after the second short-distance wireless communication module receives the first message within the second periodicity, comparing signal strength of the received first message with preset signal strength, where the preset signal strength is signal strength of the first message received by the second short-distance wireless communication module when there is no interference and when the first short-distance wireless communication module transmits at the first transmit power; the second short-distance wireless communication module sends a third notification message to the processor after the signal strength of the received first message is greater than the preset signal strength; and after receiving the third notification message, the processor indicates the first short-distance wireless communication module to reduce the transmit power until the signal strength of the received first message is equal to the preset signal strength.

According to any one of the fifth aspect or the implementations of the fifth aspect, the electronic device further includes a fourth short-distance wireless communication module, where a distance of a second message broadcast by the fourth short-distance wireless communication module is greater than the first distance; and before the first short-distance wireless communication module broadcasts the first message at the first transmit power based on the first periodicity, the electronic device further performs the following steps: broadcasting, by using the fourth short-di stance wireless communication module, a second message; receiving a pairing request message of the mobile device; and in response to the pairing request message, broadcasting, by using the fourth short-distance wireless communication module, a pairing response message to the mobile device, to complete pairing with the mobile device.

According to any one of the fifth aspect or the implementations of the fifth aspect, a distance of the second message broadcast by the fourth communication module is greater than a distance of the first message broadcast by the first short-distance wireless communication module, or the fourth short-distance wireless communication module is the first short-distance wireless communication module.

According to any one of the fifth aspect or the implementations of the fifth aspect, before receiving the first message broadcast by the electronic device based on the first periodicity, the mobile device further performs the following steps: obtaining a digital key, where the digital key is used to verify permission of the mobile device to control the transportation means to perform the specific function; sending an authentication request message to the electronic device, where the authentication request message carries authentication information, and the authentication information is generated based on the digital key; receiving an authentication response message from the electronic device; and determining, in response to the authentication response message, that the mobile device obtains the permission to control the transportation means to perform the specific function.

Before broadcasting the first message based on the first periodicity, the electronic device further performs the following steps: obtaining a digital key, where the digital key is used to verify permission of the mobile device to control the transportation means to perform the specific function; receiving an authentication request message sent by the mobile device, where the authentication request message carries authentication information, and the authentication information is generated based on the digital key; and in response to the authentication request message, performing authentication on the authentication request message to obtain an authentication response message; and sending the authentication response message to the mobile device, where the authentication response message is used to notify the mobile device of obtaining permission for controlling the transportation means to perform the specific function.

Alternatively, before broadcasting the first message based on the first periodicity, the electronic device further performs the following steps: receiving, by using the fourth communication module, an authentication request message sent by the mobile device, where the authentication request message carries authentication information, and the authentication information is generated based on the digital key; in response to the authentication request message, forwarding the authentication request message to a server; and receiving an authentication response message from the server, and forwarding the authentication response message to the electronic device, where the authentication response message is used to notify the mobile device of obtaining permission for controlling the transportation means to perform the specific function.

According to any one of the fifth aspect or the implementations of the fifth aspect, the mobile device further includes a display, and further performs the following steps: receiving a prompt message sent by the electronic device, where the prompt message is used to prompt the transportation means to perform the specific function; and displaying the prompt message on the display in response to the prompt message.

According to any one of the fifth aspect or the implementations of the fifth aspect, the first message includes an identifier of the first short-distance wireless communication module, the second message includes an identifier of a fourth communication module of the electronic device, the pairing request message includes verification information of the mobile device and the identifier of the fourth communication module, and the pairing response message includes security code used for pairing with the mobile device and the identifier of the fourth communication module of the electronic device. The first short-distance wireless communication module, the third short-distance wireless communication module, and the fourth communication module establish a connection to the mobile device through any one of wireless fidelity Wi-Fi, Bluetooth, and ZigBee.

According to any one of the fifth aspect or the implementations of the fifth aspect, the mobile device further includes a display, and further performs the following steps: receiving a prompt message sent by the electronic device, where the prompt message is used to prompt that the mobile device is successfully paired with the electronic device; and displaying the prompt message on the display in response to the prompt message.

For technical effects that can be achieved in any one of the implementations of the fifth aspect, refer to technical effects that can be achieved in any one of the implementations of the first aspect and the third aspect. Details are not described herein again.

According to a sixth aspect, this disclosure provides a transportation means control system, where the system includes the electronic device according to any one of the first aspect and the implementations of the first aspect, and the mobile device according to any one of the third aspect and the implementations of the third aspect, and the system is configured to perform the method according to any one of the fifth aspect and the implementations of the fifth aspect.

Any one of the sixth aspect and the implementations of the sixth aspect respectively corresponds to any one of the first aspect, the third aspect, and the fifth aspect and the implementations of the first aspect, the third aspect, and the fifth aspect. For technical effects corresponding to any one of the sixth aspect and the implementations of the sixth aspect, refer to technical effects corresponding to any one of the first aspect, the third aspect, and the fifth aspect and the implementations of the first aspect, the third aspect, and the fifth aspect. Details are not described herein again.

According to a seventh aspect, this disclosure provides a computer-readable storage medium. The computer-readable storage medium includes a computer program, and when the computer program is run on an electronic device, the electronic device is enabled to perform the method according to any one of the second aspect or the implementations of the second aspect.

Any one of the seventh aspect or the implementations of the seventh aspect corresponds to any one of the second aspect or the implementations of the second aspect. For technical effects corresponding to any one of the seventh aspect or the implementations of the seventh aspect, refer to technical effects corresponding to any one of the second aspect or the implementations of the second aspect. Details are not described herein again.

According to an eighth aspect, this disclosure provides a computer-readable storage medium. The computer-readable storage medium includes a computer program. When the computer program is run on a mobile device, the mobile device is enabled to perform the method according to any one of the fourth aspect or the implementations of the fourth aspect.

Any one of the eighth aspect or the implementations of the eighth aspect corresponds to any one of the fourth aspect or the implementations of the fourth aspect. For technical effects corresponding to any one of the eighth aspect or the implementations of the eighth aspect, refer to technical effects corresponding to any one of the fourth aspect or the implementations of the fourth aspect. Details are not described herein again.

According to a ninth aspect, a computer program product is provided. When the computer program product is run on a computer, the computer is enabled to perform the method according to any one of the second aspect or the implementations of the second aspect, or the method according to any one of the fourth aspect or the implementations of the fourth aspect.

Any one of the ninth aspect or the implementations of the ninth aspect corresponds to any one of the second aspect and the fourth aspect, and the implementations of the second aspect and the fourth aspect. For technical effects corresponding to any one of the ninth aspect and the implementations of the ninth aspect, refer to technical effects corresponding to any one of the second aspect and the fourth aspect, and the implementations of the second aspect and the fourth aspect. Details are not described herein again.

BRIEF DESCRIPTION OF DRAWINGS

To describe the technical solutions in embodiments of this disclosure more clearly, the following briefly describes the accompanying drawings for describing the embodiments. It is clear that the accompanying drawings in the following description show merely some embodiments of this disclosure. A person of ordinary skill in the art may further derive other drawings based on these accompanying drawings without creative efforts.

DESCRIPTION OF EMBODIMENTS

The following clearly describes the technical solutions in embodiments of this disclosure with reference to the accompanying drawings in embodiments of this disclosure.

Terms used in the following embodiments are merely intended to describe specific embodiments, but are not intended to limit this disclosure. The terms "one", "a", "the foregoing", "the", "this" and "the one" of singular forms used in this specification and the appended claims of this disclosure are also intended to include expressions such as "one or more", unless otherwise specified in the context clearly. It should be further understood that, in embodiments of this disclosure, "one or more" refers to one or more than two (including two), and "and/or" describes an association between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized.

For ease of description, in subsequent descriptions, an example in which a vehicle is used as a transportation means is used for description. It should be emphasized that the technical solutions in this disclosure are not only applicable to vehicles, but also applicable to various transportation devices such as a ship, an airplane, and a train.

Figure 1:
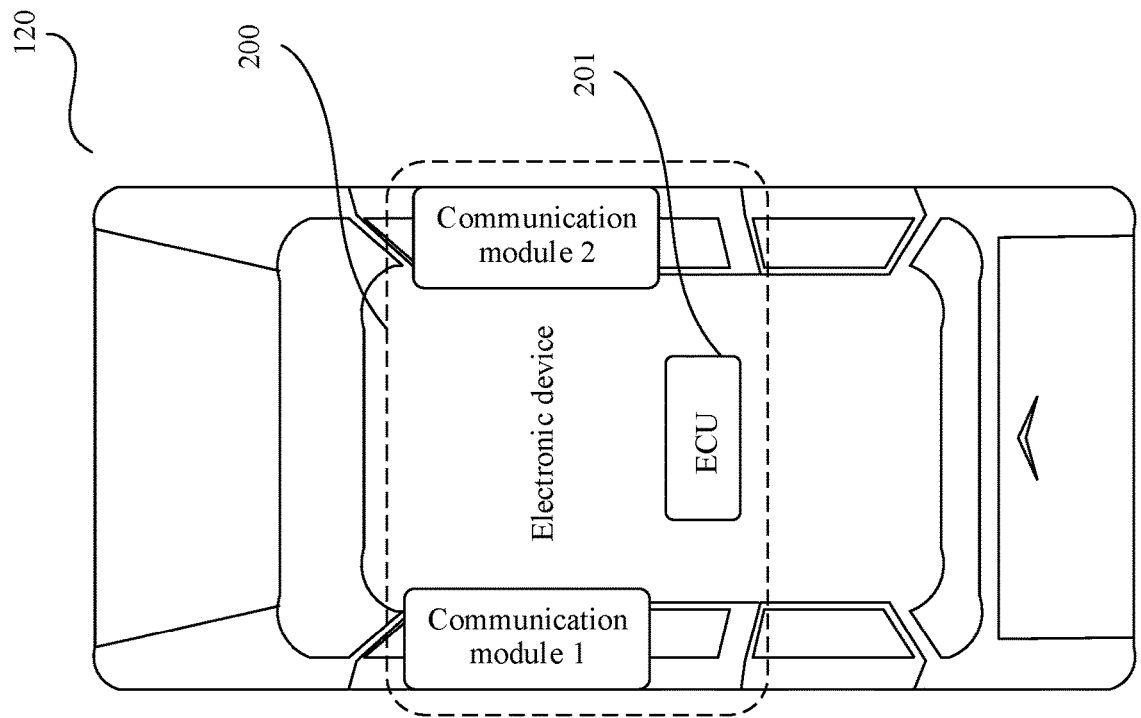
FIG. 1 is a schematic diagram of a scenario of a transportation means control method according to an embodiment of this disclosure.
Figure 1:
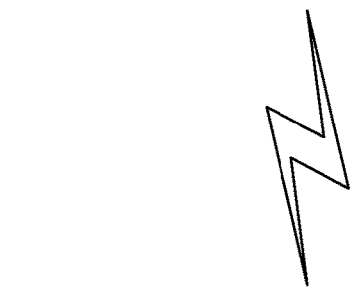
Figure 1:
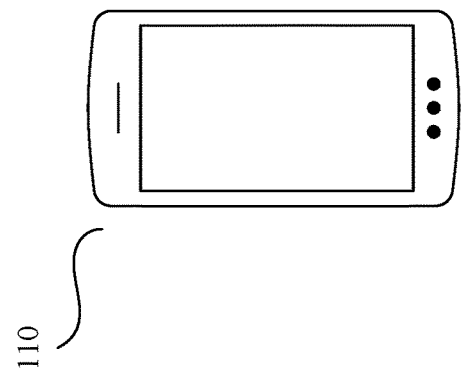

For example, FIG. 1 is a schematic diagram of a scenario of a transportation means control method according to an embodiment of this disclosure. As shown in FIG. 1, within a specific distance from an electronic device 200, a mobile device 110 communicates with the electronic device 200 in a wireless communication manner, and the electronic device 200 is located in a vehicle such as a car 120.

The electronic device 200 includes an electronic control unit (ECU), a communication module 1, and a communication module 2. The ECU is configured to control the communication module 1 and the communication module 2, and receive information transmitted by the communication module 1 and the communication module 2. Both the communication module 1 and the communication module 2 are short-distance communication modules, and are respectively located on or near vehicle doors on both sides. Once positions of the communication module 1 and the communication module 2 are determined, a distance between the two is a fixed value. Preferably, the communication module 1 and the communication module 2 are located at corresponding positions. For example, there are two vehicle doors on both the left side and the right side of the vehicle, the communication module 1 is located between the two vehicle doors on the left side, the communication module 2 is located between the two vehicle doors on the right side, and a connection line between the communication module 1 and the communication module 2 is parallel to seats in the vehicle, front two wheels of the vehicle, and rear two wheels of the vehicle. Optionally, the electronic device may further include a communication module 3 (not shown in the figure). The communication module 3 may be located at another position of the vehicle. The another position may be a joint position between a front windshield and an engine cover of the vehicle or near the joint position. Optionally, the electronic device may further include more communication modules such as a communication module 4, which are also distributed at other positions of the vehicle. Each communication module is located at a different position, and is located in the vehicle. Once the position of each communication module is determined, a distance between any two communication modules and a distance between any communication module and the ECU are fixed values. Optionally, each communication module may be integrated with a separate processing unit. In this way, the separate processing unit receives a command sent by the ECU, and sends the command to a corresponding communication module. The separate processing unit receives information returned by the corresponding communication module, and sends the information to the ECU. In this case, both the communication module and the ECU may be considered as separate devices. Optionally, each communication module may not be integrated with an independent processing unit, and is only configured to perform communication. In this case, the communication module may be considered as a communication unit of the electronic device. Optionally, each communication module may communicate with the ECU in a wired manner (for example, by using a bus) or a wireless manner (a short-distance communication manner such as Bluetooth, Wi-Fi, or ZigBee).

The electronic device 200 may work in the following modes. An example in which the electronic device shown in FIG. 1 includes the communication module 1 and the communication module 2 is used for description. In this mode, the communication module 1 and the communication module 2 broadcast a request signal based on a specific periodicity. When the mobile device 110 moves from a left side of a vehicle 120 to a position at a specific distance away from the communication module 1, the mobile device 110 receives the request signal. The mobile device 110 sends a response signal to the communication module 1. After receiving the response signal, the communication module 1 transmits the response signal to an ECU 201. The ECU 201 determines, based on the response signal and a preset matching relationship, whether the mobile device 110 matches the electronic device 200. When the mobile device 110 matches the electronic device 200, the mobile device 110 may control the electronic device 200 through wireless communication with the communication module 1, so as to control a vehicle such as a car 120, to implement a specific function. If the mobile device 110 does not match the electronic device 200, the communication module 1 and the communication module 2 continue to broadcast the request signal based on the specific periodicity. If the mobile device 110 moves from a right side of the vehicle, the communication module 1 described above is replaced with the communication module 2, and the communication module 2 is replaced with the communication module 1. Details are not described herein again.

In some examples, the ECU 201 may be an in-vehicle remote information terminal (telematics BOX, T-BOX) installed in the vehicle. In other examples, the ECU 201 includes a T-BOX and an in-vehicle infotainment (IVI) system.

In this embodiment of this disclosure, each communication module such as the communication module 1 and the communication module 2 of the electronic device 200 may establish a connection to the mobile device by using a wireless communication technology such as wireless fidelity (Wi-Fi), Bluetooth low energy (BLE), or ZigBee.

In embodiments of this disclosure, the mobile device includes but is not limited to a smartphone, a smart headset, a tablet computer, and a wearable electronic device (such as a smartwatch, a smart band, a smart ring, and smart glasses) with a wireless communication function. An example embodiment of the mobile device includes, but is not limited to, a portable electronic device on which iOS®, Android®, Microsoft®, Windows, Linux, or another operating system is installed. The mobile device may alternatively be another portable electronic device such as a laptop (Laptop). It should be further understood that in some other embodiments, the mobile device may not be a portable electronic device, but a fixed electronic device such as a desktop computer.

Figure 2:
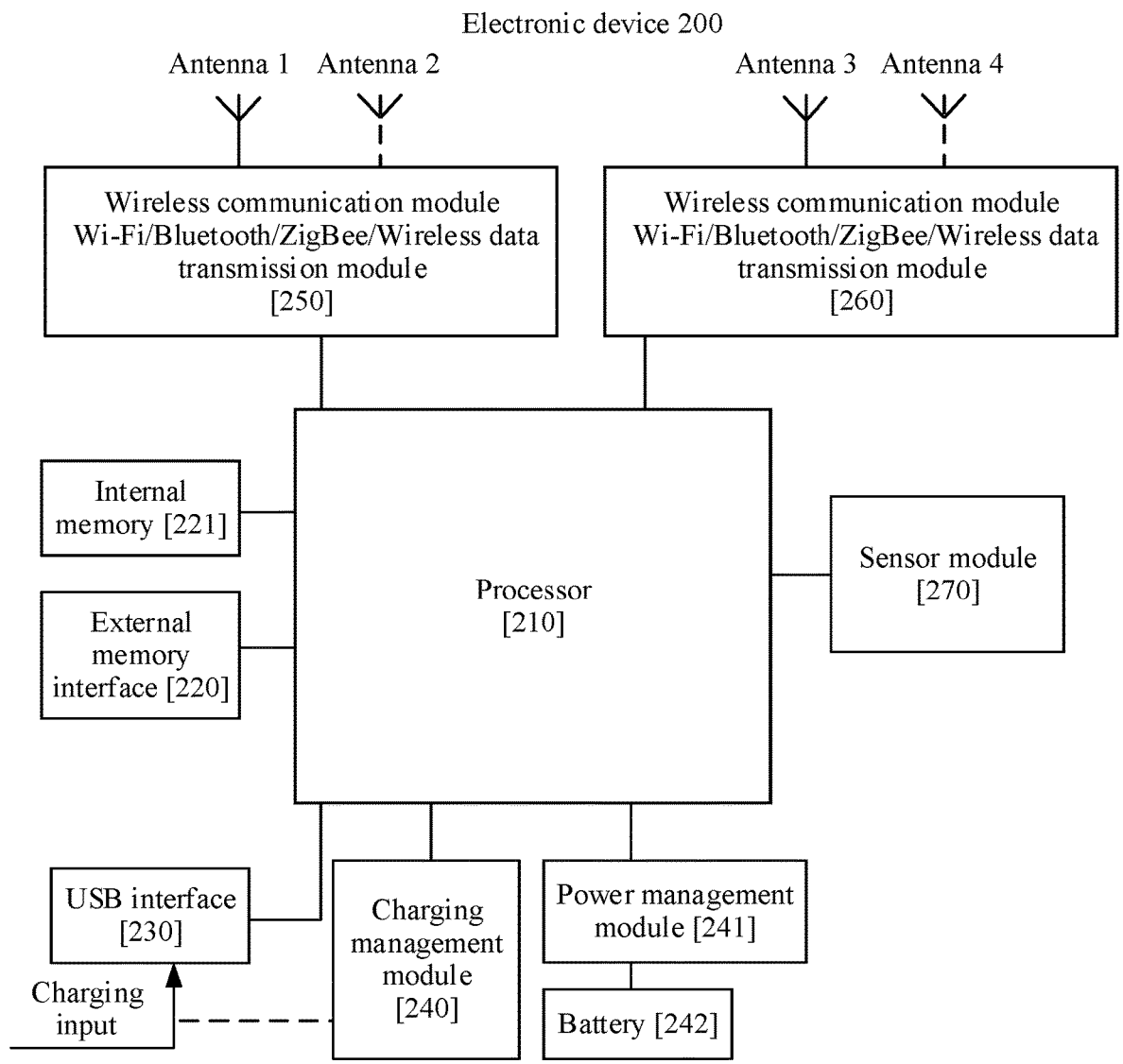
FIG. 2 is a schematic diagram of a hardware structure of an electronic device according to an embodiment of this disclosure.

For example, FIG. 2 is a schematic diagram of a structure of an electronic device 200. The electronic device 200 may include a processor 210, an external memory interface 220, an internal memory 221, a universal serial bus (USB) interface 230, a charging management module 240, a power management module 241, a battery 242, an antenna 1, an antenna 2, a wireless communication module 250, an antenna 3, an antenna 4, a wireless communication module 260, a sensor module 270, and the like.

It may be understood that, the structures shown in embodiments of this disclosure do not constitute specific limitation on the electronic device 200. In some other embodiments of this disclosure, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (neural-network processing unit, NPU). Different processing units may be independent components, or may be integrated into one or more processors. In some embodiments, the electronic device 200 may alternatively include one or more processors 210. The controller may generate an operation control signal based on instruction operation code and a time sequence signal, to complete control of instruction reading and instruction execution.

In some embodiments, the processor 210 may include one or more interfaces. The interface may include an inter-integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 230 is an interface that conforms to a USB standard specification, and may be specifically a mini USB interface, a micro USB interface, a USB type-C interface, or the like. The USB interface 230 may be configured to connect to a charger to charge the electronic device 200, or may be configured to transmit data between the electronic device 200 and a peripheral device.

It may be understood that, an interface connection relationship between the modules shown in this embodiment of this disclosure is merely an example for description, and does not constitute a limitation on the structure of the electronic device 200. In some other embodiments of this disclosure, the electronic device 200 may alternatively use an interface connection mode different from an interface connection mode in this embodiment, or a combination of a plurality of interface connection modes.

The charging management module 240 is configured to receive a charging input from the charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the electronic device 200. The charging management module 240 supplies power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 221, the external memory interface 220, the wireless communication module 250, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented by using the antenna 1, the antenna 2, the wireless communication module 250, the antenna 3, the antenna 4, the wireless communication module 260, and the like. It should be noted that the electronic device 200 may further include a plurality of antennas and a plurality of wireless communication modules. The wireless communication module 250 and the wireless communication module 260 are merely examples. The antenna 1, the antenna 2, the antenna 3, and the antenna 4 are merely examples. In this case, more antennas and other wireless communication modules may also implement a wireless communication function of the electronic device 200.

The wireless communication module 250 may provide a wireless communication solution applied to the electronic device 200, and the wireless communication solution includes Wi-Fi, Bluetooth (BT), a wireless data transmission module (for example, 433 MHz, 868 MHz, or 915 MHz), and the like. The wireless communication module 250 may be one or more components integrating at least one communication processing module. The wireless communication module 250 receives an electromagnetic wave through the antenna 1 or the antenna 2, performs filtering and frequency modulation processing on an electromagnetic wave signal, and sends a processed signal to the processor 210. The wireless communication module 250 may further receive a to-be-sent signal from the processor 210, perform frequency modulation and amplification on the signal, and convert the signal into an electromagnetic wave for radiation through the antenna 1 or the antenna 2.

The wireless communication module 260 is the same as the wireless communication module 250, and the antenna 3 and the antenna 4 are respectively the same as the antenna 1 and the antenna 2. Details are not described herein again.

In this embodiment of this disclosure, the electronic device 200 may send a broadcast message by using the wireless communication module. The broadcast message may carry a device identifier or a product identifier of the electronic device 200, so that a surrounding device discovers the electronic device. The electronic device 200 may further receive, by using the wireless communication module, a message sent by the surrounding device.

The external memory interface 220 may be configured to connect to an external storage card, for example, a micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store one or more computer programs, and the one or more computer programs include instructions. The processor 210 may run the instructions stored in the internal memory 221, so that the electronic device 200 performs a transportation means control method provided in some embodiments of this disclosure, various applications, data processing, and the like. The internal memory 221 may include a code storage area and a data storage area. The code storage area may store an operating system. The data storage area may store data created during use of the electronic device 200, and the like. In addition, the internal memory 221 may include a high-speed random access memory, or may include a nonvolatile memory, for example, one or more magnetic disk storage devices, a flash memory device, or a universal flash storage (UFS). In some embodiments, the processor 210 may run the instructions stored in the internal memory 221 and/or instructions stored in the memory disposed in the processor 210, to enable the electronic device 200 to perform the transportation means control method provided in embodiments of this disclosure, other applications, and data processing.

In an example, the wireless communication module 250 in FIG. 2 may be the communication module 1 in FIG. 1, and the wireless communication module 260 in FIG. 2 may be the communication module 2 in FIG. 1. The processor 210 in FIG. 2, or all or some of the processor 210 in FIG. 2 and surrounding modules and memories, and the like may be the ECU 201 in FIG. 1.

Figure 3A:
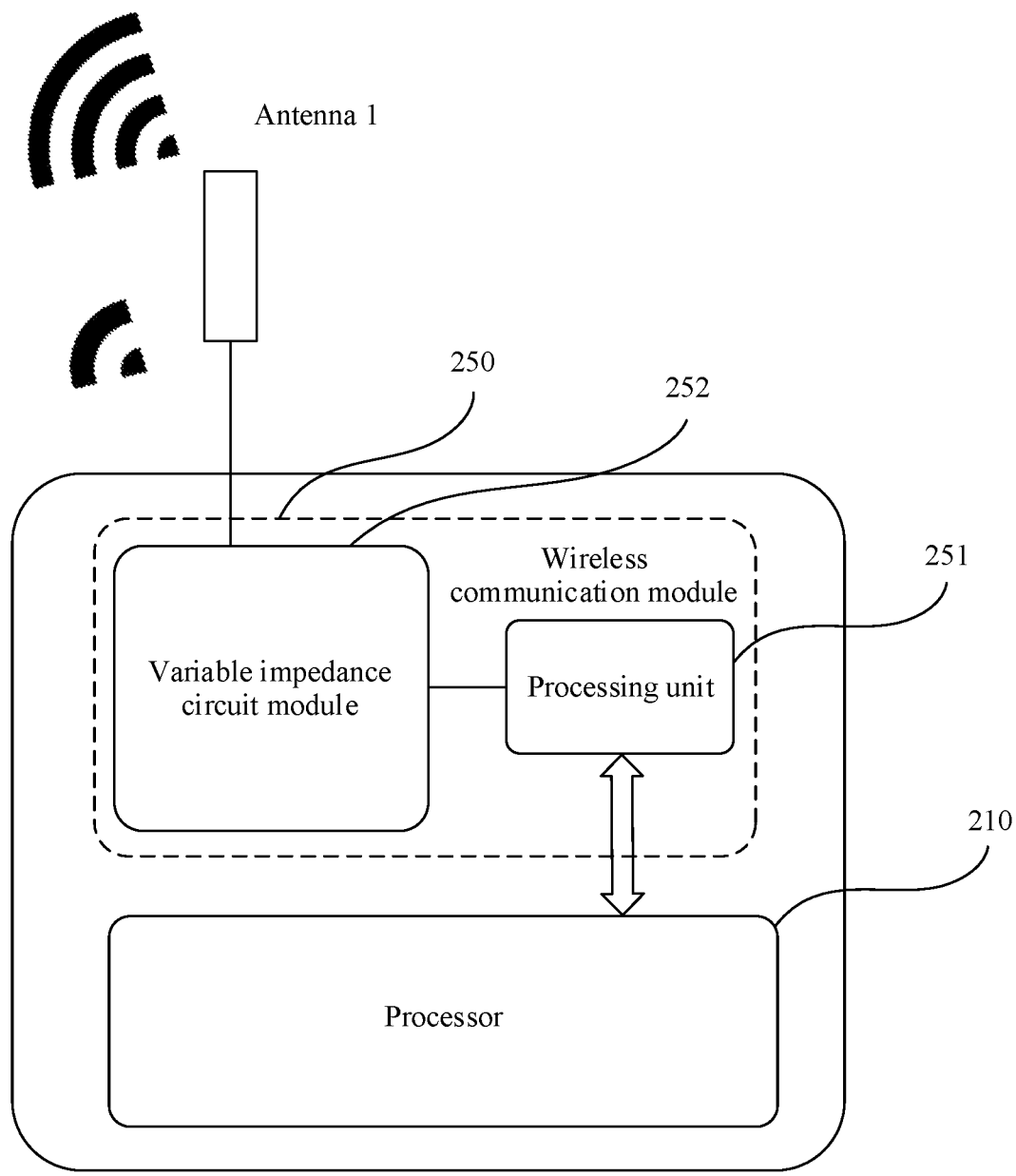
FIG. 3A is a schematic diagram of a principle structure of a wireless communication module and an antenna in an electronic device according to an embodiment of this disclosure.

For example, FIG. 3A shows a principle structure of a wireless communication module and an antenna in an electronic device according to an embodiment of this disclosure. As shown in FIG. 3A, the electronic device 200 may include a processor 210, a wireless communication module 250, and an antenna 1. The wireless communication module 250 includes a processing unit 251 and a variable impedance circuit module 252. The antenna 1 is configured to transmit and receive a radio signal. The variable impedance circuit module 252 may be a circuit, an integrated line, or the like, including a variable impedance part. The processor 210 adjusts, by controlling and adjusting a resistance value of the variable impedance circuit module 252, power loaded on the antenna 1, so as to control a transmit distance for transmitting a wireless signal by the antenna 1. For example, when the resistance value of the variable impedance circuit module 252 is a first resistance value, a transmit power of the antenna 1 is a first transmit power, and in this case, the distance for transmitting a wireless signal by the antenna 1 is a first transmit distance (for example, 200 cm). When the resistance value of the variable impedance circuit module 252 is a second resistance value, a transmit power of the antenna 1 is a second transmit power, and in this case, the distance for transmitting a wireless signal by the antenna 1 is a second transmit distance (for example, 300 cm). When the resistance value of the variable impedance circuit module 252 is a third resistance value, a transmit power of the antenna 1 is a third transmit power, and in this case, the distance for transmitting a wireless signal by the antenna 1 is a third transmission distance (for example, 400 cm). Optionally, a resistance value of the variable impedance circuit module 252 may further include a fourth resistance value, a fifth resistance value, or the like. Correspondingly, a transmit power of the antenna 1 may be a fourth transmit power, a fifth transmit power, or the like. In this case, the distance for transmitting a wireless signal by the antenna 1 may be a fourth transmission distance, a fifth transmission distance, or the like.

In another optional implementation, the transmit power of the antenna 1 may be adjusted by adjusting an input power of the antenna 1. In this disclosure, the transmit power of the antenna 1 may be adjusted by adjusting the input power and adjusting different resistors, or priorities may be set for adjusting the input power and adjusting different resistors. For example, when the transmit power is increased, the input power may be first increased, and then the different resistors are adjusted, or the different resistors may be adjusted, and then the input power is increased. This is not limited herein.

The first transmit power, the second transmit power, the third transmit power, the fourth transmit power, the fifth transmit power, and the like are in descending order; and the first transmission distance, the second transmission distance, the third transmission distance, the fourth transmission distance, the fifth transmission distance, and the like are in descending order.

Figure 3B:
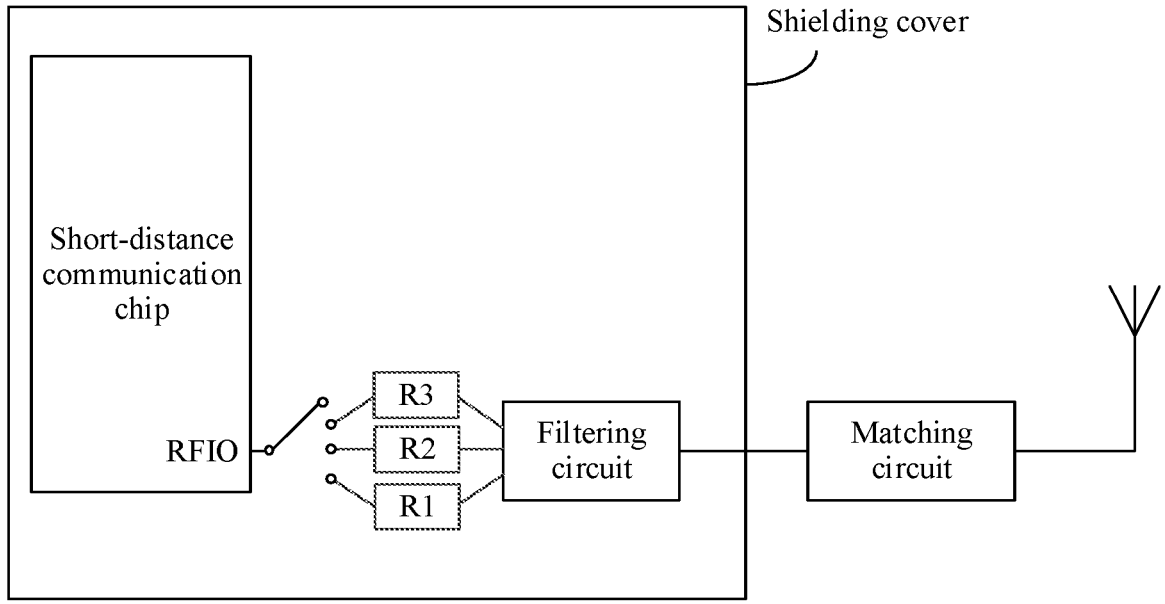
FIG. 3B is a schematic diagram of a specific structure of a wireless communication module and an antenna in an electronic device according to an embodiment of this disclosure.

For example, FIG. 3B shows a specific structure of a wireless communication module and an antenna in an electronic device according to an embodiment of this disclosure. As shown in FIG. 3B, an RFIO pin of a short-distance communication chip in a shielding cover may be connected to any one of three switches. Resistors of the three switches are R1, R2, and R3. R1, R2, and R3 are different, so that a transmit power of an antenna after any one of the three switches is connected may be adjusted. Optionally, after the RFIO pin is separately connected to branches on which R1, R2, and R3 are located, transmit powers of the antenna are respectively a first transmit power, a second transmit power, and a third transmit power. It should be noted that the three branches in FIG. 3B are merely examples. FIG. 3B may further include a fourth branch, a fifth branch, and the like (not shown in the figure).

With reference to FIG. 1 and FIG. 2, the following provides description by using an example in which the wireless communication module 250 of the electronic device 200 (for example, an in-vehicle device in a vehicle) in FIG. 2 is the communication module 1 in FIG. 1 and is a Bluetooth communication module, and the wireless communication module 260 in FIG. 2 is the communication module 2 in FIG. 1 and is also a Bluetooth communication module.

Figure 4:
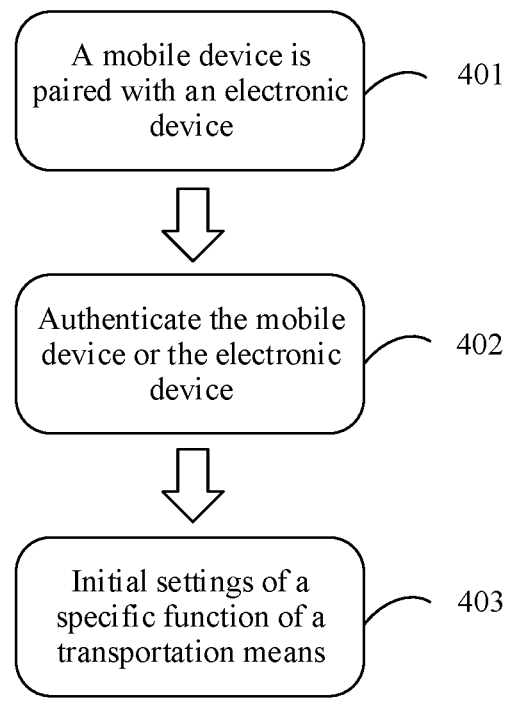
FIG. 4 is a schematic flowchart of initial settings prior to a transportation means control method according to an embodiment of this disclosure.

FIG. 4 is a schematic flowchart of initial settings prior to a transportation means control method according to an embodiment of this disclosure. Specific steps are included.

Step 401: A mobile device 110 is paired with the electronic device 200.

For example, the mobile device 110 approaches a vehicle from a left side of the vehicle from far to near. After receiving a signal broadcast by the communication module 1, the mobile device 110 determines whether the mobile device 110 is paired with the electronic device 200. After it is determined that the electronic device 200 is an electronic device paired with the mobile device 110, the mobile device 110 and the electronic device 200 are paired and the pairing is completed.

Step 402: Authenticate the mobile device.

The communication module 1 receives authentication information (such as identity information, key information of a vehicle key, or other verification information associated with the identity information) sent by the mobile device 110, and sends the authentication information to the ECU 201. After receiving the authentication information, the ECU 201 may perform authentication locally, or may perform authentication by using a cloud server (not shown in the figure).

Step 403: Initial settings of a specific function of a transportation means.

After the authentication succeeds, when the communication module 1 monitors a distance between the mobile device 110 and the communication module 1 to be within a security distance, the preset specific function is performed. The preset specific function is a function preset in advance. The specific function may be a single function, or may be a combined function, for example, unlocking a vehicle door, igniting a vehicle, or a combination of unlocking a vehicle door and igniting a vehicle.

After the authentication succeeds, if the communication module 1 detects that a distance between the mobile device 110 and the communication module 1 is within a security distance, the communication module 1 performs the preset specific function. The preset specific function is a function preset in advance. The specific function may be a single function, or may be a combined function, for example, unlocking a vehicle door, igniting a vehicle, or a combination of unlocking a vehicle door and igniting a vehicle.

Figure 5:
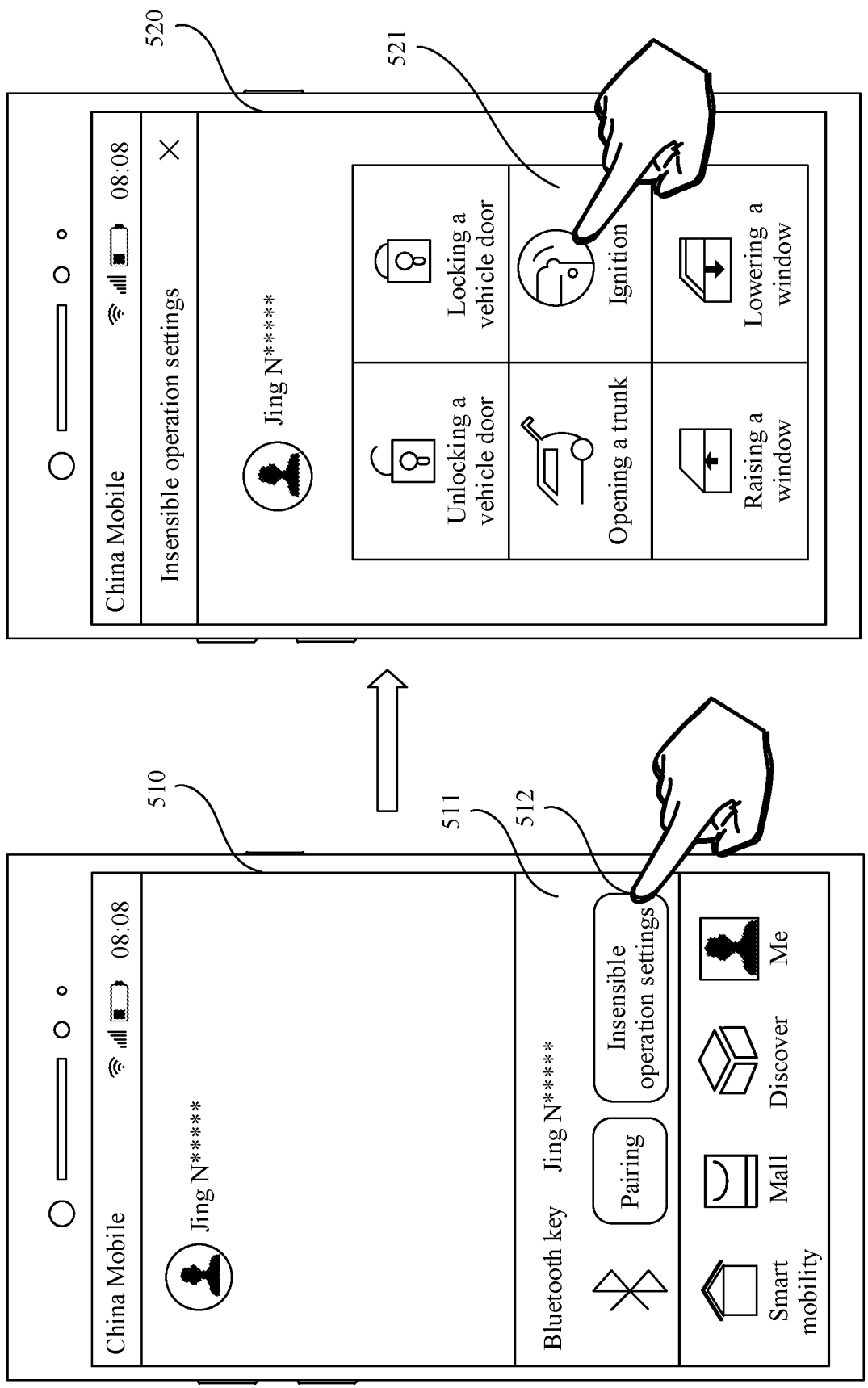
FIG. 5 is a schematic diagram of a user interface of a mobile device in initial settings prior to a transportation means control method according to an embodiment of this disclosure.

For example, the user may enter account information of a user on a login interface of a vehicle manufacturer app. The account information of the user may be account information obtained after authentication by a server of the vehicle. In response to an input operation of the account information of the user, the mobile device 110 may initiate a verification request to a server (for example, the server of the vehicle) corresponding to the vehicle manufacturer app. After an account and a password of the user are successfully verified, the mobile device 110 receives a verification success response returned by the server, and displays a login success interface on the vehicle manufacturer app. For example, the mobile device displays a home screen 510 of the vehicle manufacturer app shown in a of FIG. 5. The home screen 510 may include a "Bluetooth key" page 511. As shown in a of FIG. 5, the "Bluetooth key" page 511 includes a "Bluetooth" icon, an "insensible operation settings" button 512, and the like. The "Bluetooth" icon is used to set up a Bluetooth connection or a Bluetooth disconnection. The user may control a specific function that is automatically executed by the vehicle by tapping the "insensible operation settings" button 512 to set the Bluetooth key. The mobile device receives a tap operation performed by the user on the "insensible operation settings" button 512; and in response to the tap operation performed by the user on the "insensible operation settings" button 512, the mobile device displays an "insensible operation settings" interface 520. As shown in b of FIG. 5, the "insensible operation settings" interface 520 may include buttons such as an "unlocking a vehicle door" button, a "locking a vehicle door" button, an "opening a trunk" button, an "ignition" button, a "raising a window" button, and a "lowering a window" button. The user can tap any button to set the function corresponding to the button to be automatically executed. For example, the mobile device receives an operation of tapping the "ignition" button 521 by the user, and the electronic device sets, based on an instruction of the mobile device, a function of starting the vehicle to be automatically executed. After the vehicle receives an execution command sent by the electronic device for a specific function, the vehicle is automatically started.

In some embodiments, the user may set, in a vehicle key function, a Bluetooth unlocking function, or may set that the vehicle is started after the vehicle is unlocked, or may set an unlocking mode option such as opening a vehicle door. The set unlocking mode may be configured for the vehicle in advance before unlocking, or may be sent to the vehicle in an unlocking process. For example, the set unlocking mode may be configured in advance. The mobile device 110 may tap a control 522 in the interface 520, to jump to a Bluetooth key personalized setting interface, so as to set the unlocking mode. In response to an operation of determining an unlocking mode of a setting interface, the mobile device 110 may send an unlocking mode configuration request message to the electronic device 200, so that the electronic device 200 determines, based on the received unlocking mode configuration request message, an unlocking mode corresponding to the mobile device 110. In this way, when the mobile device 110 triggers unlocking, the ECU 201 in the electronic device 200 may unlock the vehicle based on the unlocking mode.

In a possible embodiment, a scenario 1 (or an unlocking mode 1) may be set. When an unlocking condition is met, that is, when the mobile device 110 enters a vehicle unlocking security distance, only a vehicle door corresponding to the driver's seat is unlocked. In a possible embodiment, a scenario 2 (or an unlocking mode 2) may be set. When an unlocking condition is met, that is, when the mobile device 110 enters a vehicle unlocking security distance, all vehicle doors are unlocked. In a possible embodiment, a scenario 3 (or an unlocking mode 3) may be set.

When an unlocking condition is met, that is, when the mobile device 110 enters a vehicle unlocking security distance, a vehicle door is opened based on a position of the user. When the user approaches the vehicle from the rear of the vehicle, only the trunk is opened. When the user approaches the vehicle door of the driver's seat, the vehicle door of the driver's seat is correspondingly opened. In another possible embodiment, a scenario 4 may be further set. For example, in response to a selection operation of the user for unlocking a vehicle door of a vehicle, the selected vehicle door is unlocked when an unlocking condition is met, that is, when the mobile device 110 enters a vehicle unlocking security distance. Alternatively, combination may be performed based on different specific functions. For example, the scenario 1 may be a scenario in which a vehicle door of a driver's seat is opened, ignition is performed, and an air conditioner is started. This is not limited herein.

In some other embodiments, due to different use habits of the user, the user may further set an unlocking range of a Bluetooth key on a Bluetooth key configuration interface. It should be noted that a threshold parameter of a transmit power of the communication module 1 may be set during initial installation or update, or may be adjusted based on an unlocking range set by the user for the vehicle.

In some embodiments, when the user needs to start the vehicle at a long distance, for example, at a distance 5 m to 10 m away from the vehicle, a transmit power threshold of each transmit power of the communication module may be increased, so that the mobile device may start the vehicle at a specified position. In some other embodiments, when the user needs to start the vehicle at a short distance, for example, at a distance within 1 m away from the vehicle, a transmit power threshold of the communication module 1 may be decreased, to reduce a coverage area of the signal broadcast by the communication module, so that the mobile device may start the vehicle at the set position. Further, the user may further set different unlocking ranges for starting the vehicle for different positions of the communication module, and may also set different unlocking ranges for different scenarios. For example, a long unlocking distance may be set for opening the trunk, and in a scenario in which opening the vehicle door of the driver's seat and performing the ignition operation are combined, an unlocking range may be set to a short range, to ensure security.

Figure 6:
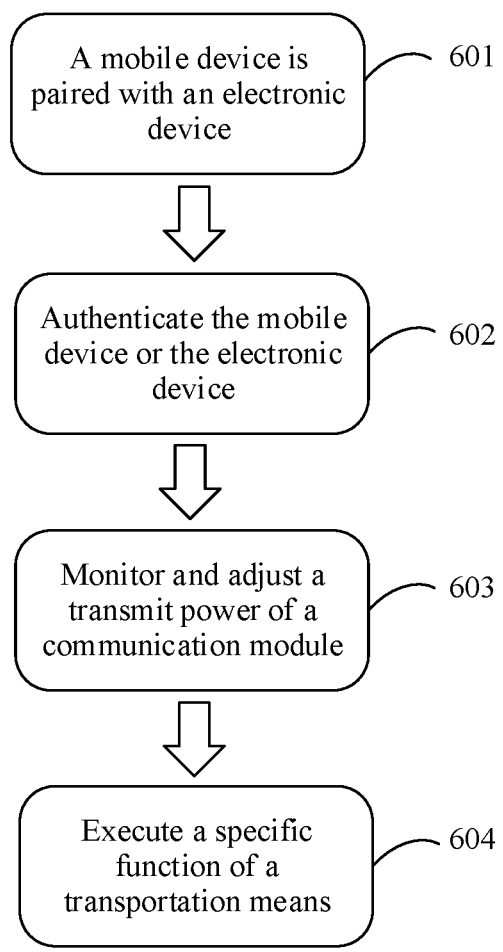
FIG. 6 is a schematic flowchart of a transportation means control method according to an embodiment of this disclosure.

FIG. 6 is a schematic flowchart of a transportation means control method according to an embodiment of this disclosure. Specific steps are included.

Step 601: The mobile device 110 is paired with the electronic device 200.

Figure 7A:
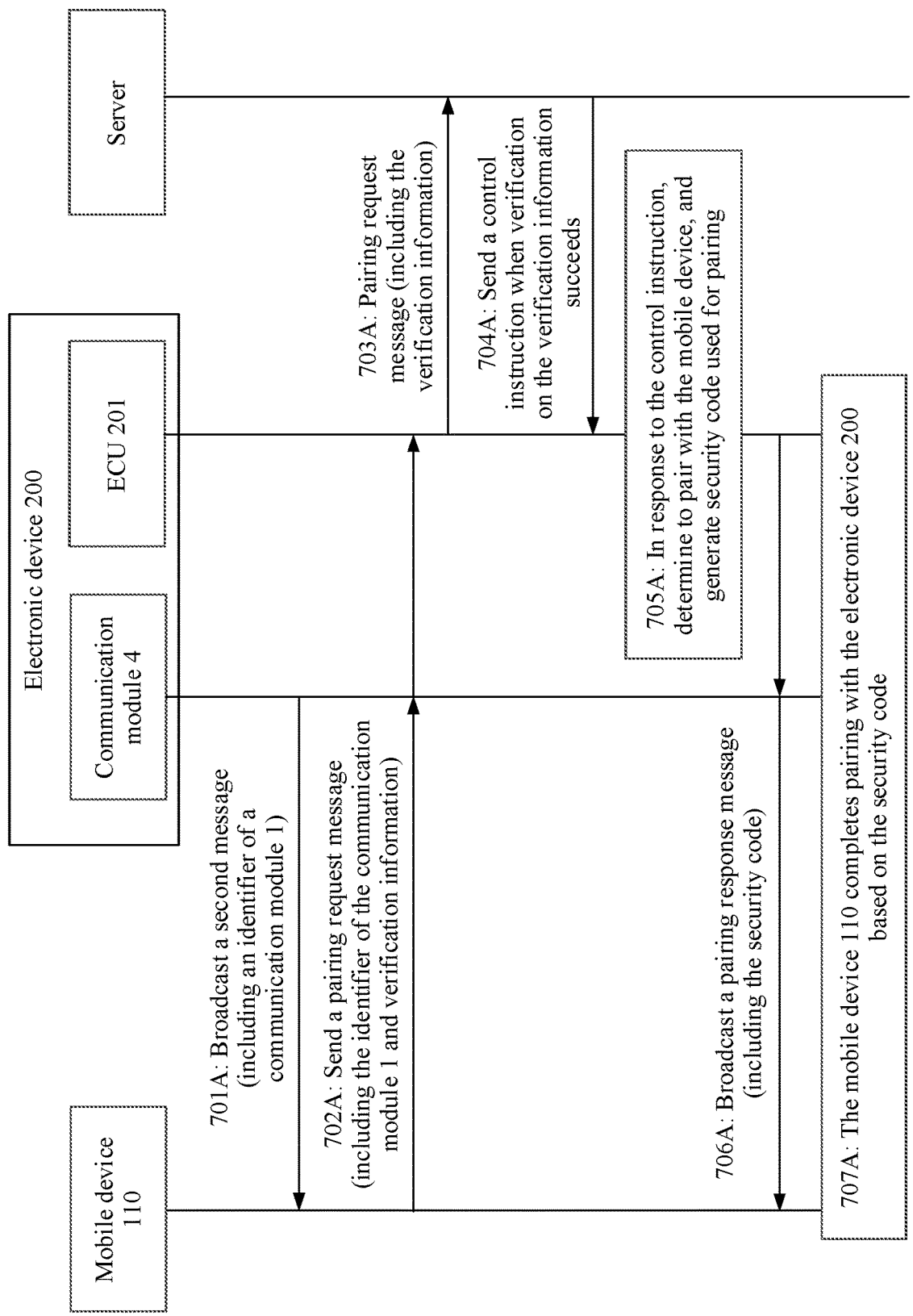
FIG. 7A is a schematic flowchart of steps of pairing a mobile device with an electronic device in a transportation means control method according to an embodiment of this disclosure.

In a possible implementation, for pairing of the mobile device 110 with the electronic device 200 in step 601, refer to the pairing manners in step 501 and FIG. 7A. Details are not described herein again. In another possible implementation, it is considered that the mobile device 100 has been successfully paired with the electronic device 200, and the electronic device 200 stores pairing information of the mobile device 110, therefore, the electronic device 200 may verify, based on historically stored pairing information of the mobile device 110, that the mobile device 110 sends a pairing request, to determine whether to pair with the mobile device 110.

Step 602: Authenticate the mobile device.

After establishing a secure connection to the electronic device 200, the mobile device may perform an authentication process of the mobile device and the electronic device 200, to determine whether the mobile device is a mobile device that legally performs a specific function of a transportation means. For details, refer to step 502 and the following manner in FIG. 7B. Details are not described herein again.

In a possible implementation, the ECU 201 may transmit a broadcast signal by using another communication module, for example, the communication module 4 before step 601, so as to avoid that a plurality of communication modules in the electronic device 200 are in a state of transmitting a broadcast signal for a long time and power consumption is high, and to reserve plenty of time for step 603 or step 604. A large coverage area of the broadcast signal can ensure that pairing and authentication between the mobile device and the ECU 201 are completed before the mobile device and the ECU 201 enter a security distance. For example, when the mobile device is at a long distance (for example, 100 m) from the ECU 201, a second message is broadcast by using the communication module 4, so that the mobile device establishes a Bluetooth connection to the communication module 4, and the ECU 201 receives a pairing request or an authentication request sent by the mobile device. In this way, the ECU 201 may perform pairing and authentication with the mobile device by using the communication module 4.

Step 603: Monitor and adjust the transmit power of the communication module.

After completing pairing and authentication with the mobile device, the ECU 201 module may enable a communication module configured to determine whether the mobile device and the vehicle are located within the security distance. To ensure positioning accuracy of the mobile device and the vehicle, the communication module may be a short-distance Bluetooth module. In this embodiment of this disclosure, a plurality of communication modules may cooperate with each other, to avoid a problem that a distance between the mobile device and the vehicle cannot be accurately positioned in a scenario such as a scenario in which a signal transmitted by the communication module is interfered.

With reference to FIG. 1, in a possible scenario, both the communication module 1 and the communication module 2 are short-distance Bluetooth modules. In this case, the communication module 1 and the communication module 2 may monitor each other, to determine whether signal coverage areas broadcast by the communication module 1 and the communication module 2 meet the security requirement.

For example, the communication module 1 monitors a signal broadcast by the communication module 2. When the communication module 1 receives the signal broadcast by the communication module 2, it may be determined that a radius of a coverage area of the signal broadcast by the communication module 2 is at least a distance between the communication module 1 and the communication module 2. When the communication module 1 cannot receive the signal broadcast by the communication module 2, it indicates that interference may exist in the signal broadcast by the communication module 2, and the radius of the coverage area of the signal broadcast by the communication module 2 is less than 2 meters. In this case, the transmit power of the communication module 2 may be increased, so that the communication module 1 can receive the signal broadcast by the communication module 2, and the coverage area of the signal broadcast by the communication module 2 meets the security requirement.

Step 604: Execute the specific function of the transportation means.

For example, the mobile device approaches from the right side of the vehicle, that is, the mobile device preferentially receives the broadcast signal of the communication module 2. If the communication module 2 detects that the distance between the mobile device 110 and the communication module 2 is within the security distance, the preset specific function is performed.

In some embodiments, with reference to FIG. 1, for example, the mobile device approaches the vehicle from the right side, the electronic device 200 may send an identifier (for example, a MAC address) of the communication module 2 to the mobile device by using a signal broadcast by the communication module 2. When the mobile device receives the broadcast signal of the communication module 2, the mobile device may obtain the identifier of the communication module 2, so that the mobile device may send a first response message of the specific function of the transportation means to the communication module 2 based on the identifier of the communication module. When the communication module 2 receives the first response message sent by the mobile device, the communication module 2 may forward the first response message to the ECU 201, so that the ECU 201 determines that the distance between the mobile device 110 and the communication module 2 is within the security distance, so as to determine that specific function of the transportation means can be performed.

For example, the specific function of the transportation means is vehicle unlocking. When the ECU 201 determines that the distance between the mobile device 110 and the communication module 2 is within the security distance, the ECU 201 may perform a vehicle unlocking operation.

For example, the communication module 1 receives the first response message of the mobile device, and the first response message carries the identifier of the communication module 1. In an embodiment, when it is determined that the electronic device 200 can be unlocked, the first response message may be forwarded to the Bluetooth key ECU 201 by using the communication module 2. For example, the communication module 2 sends the first response message to the ECU 201 by using a LIN line, so that the ECU 201 sends a CAN instruction to a vehicle body control unit ECU, and the vehicle body control unit ECU completes vehicle door unlocking. Certainly, the communication module 2 may further send the first response message to the ECU 201 in a serial port communication manner. This is not limited herein. In some other embodiments, the first response message may be further sent to the ECU 201 by using the communication module 1. The communication module 1 may forward the first response message to the communication module 2 in a Bluetooth communication manner. For example, the communication module 1 communicates with the communication module 2 by using the Bluetooth connection established between the communication module 1 and the communication module 2, so that the communication module 1 may first send the first response message to the communication module 2, and then the communication module 2 sends the first response message to the ECU 201. In some other embodiments, the communication module 1 may further directly communicate with the ECU 201 by using a LIN line, so that the ECU 201 sends a CAN instruction to a vehicle body control unit ECU, and the vehicle body control unit ECU completes vehicle door unlocking.

It is considered that the communication modules may be distributed in a plurality of manners in the vehicle, in some embodiments, the communication module 1 to the communication module 3 may be disposed at a position of a left vehicle door, a position of a right vehicle door, and a position of a trunk, and the communication module 4 may be disposed in the middle of the vehicle. Therefore, by using a Bluetooth signal transmitted by the communication module 4, a mobile phone can establish a connection to the communication module 4 of the vehicle when the mobile phone is 50 m away from the vehicle, to complete a pairing and authentication process of the mobile device and the electronic device 200. Subsequently, regardless of whether the mobile device approaches the vehicle from the rear, the side, or the front of the vehicle, the mobile device may receive, in Bluetooth signals transmitted by the communication modules 1 to 3, the Bluetooth signal transmitted by the at least one communication module, to determine that the mobile device enters the signal coverage area of the communication module. For example, the mobile device may feed back the identifier of the communication module 1 (for example, the identifier of the communication module 1) to the ECU 201 based on the received signal of the communication module 1. In this way, the vehicle key control unit ECU may be triggered to open the vehicle door. Further, the electronic device 200 may further unlock a corresponding vehicle door based on a vehicle door unlocking mode set by the user. For example, if the current vehicle door unlocking mode is unlocking a corresponding vehicle door based on a position of the mobile device 110, the ECU 201 may determine, based on an identifier of a communication module in the received first response message and a position of the communication module on the vehicle, a vehicle door to be opened. For example, when the received first response message is the identifier of the communication module 1, it may be determined that the mobile device 110 is located near a vehicle door of a driver's seat. Therefore, unlocking of the vehicle door corresponding to the driver's seat may be triggered. For another example, when the mobile device approaches the vehicle from the rear, the mobile device first receives a signal of the communication module 3. In this case, the identifier that may be fed back to the ECU 201 may be an identifier of the communication module 3, so that the vehicle key control unit ECU may open the trunk based on the identifier of the communication module 3.

In some embodiments, a communication module, that is, the communication module 1 to the communication module 4, may be disposed at positions of a left vehicle door, a right vehicle door, a vehicle head, and a trunk respectively. In this way, when the mobile device approaches the vehicle from the front, unlocking of the vehicle can be triggered earlier.

In an embodiment, when it is determined that the vehicle is in a stopped state, the ECU 201 may further enable Bluetooth functions of the communication module 4 (a Bluetooth module with a large Bluetooth signal coverage area) and the communication module 2 (a short-distance Bluetooth module), and establish a Bluetooth connection to the mobile device 110 by using the communication module 2. The communication module 4 of the electronic device 200 sends a broadcast message, and when the electronic device 200 does not receive, within a preset time, the identifier that is of the communication module 4 and that is sent by the mobile device 110, the electronic device 200 may automatically perform a vehicle locking operation.

It is considered that the user may leave the vehicle without a stall. In this case, when it is determined that the vehicle is in the stopped state, the Bluetooth functions of the communication module 4 and the communication module 2 may be enabled to reduce a security risk, and the Bluetooth connection is established to the mobile device 110 by using the communication module 2. The communication module 4 of the electronic device 200 sends the broadcast message, and when the electronic device 200 does not receive, within the preset time, the identifier that is of the communication module 4 and that is sent by the mobile device 110, it is determined that the mobile device 110 cannot receive the broadcast message of the communication module 1, to be specific, operations of stalling and vehicle locking are performed.

Further, when the electronic device 200 determines that the vehicle stops and the user leaves the vehicle, the electronic device 200 may send a notification message to the mobile device 110, to notify the user of whether a stall operation needs to be performed on the vehicle when the user leaves the vehicle without a stall. When the user does not reply within a specific time or is beyond a predetermined distance between the user and the vehicle, operations of stalling and vehicle locking are performed.

In another embodiment, after determining that the vehicle is stalled, the electronic device 200 may further determine, by monitoring whether a communication connection between the device of the communication module 2 and the mobile device 110 exists, whether the mobile device 110 is beyond the coverage area of the communication module 2, and perform a vehicle locking operation after determining that the mobile device 110 has been beyond the coverage area of the communication module 2.

FIG. 7A is a schematic flowchart of steps of pairing a mobile device with an electronic device according to an embodiment of this disclosure. In this scenario, an example in which the electronic device 200 is paired with the mobile device 110 by using a signal broadcast by the communication module 4 is used for description. Specific steps are included.

Step 701A: The electronic device 200 broadcasts a second message by using the communication module 4.

The second message may include an identifier of the communication module 4. The second message may be used to discover the electronic device 200 when the mobile device approaches the electronic device 200, so as to implement a Bluetooth connection to the communication module 4.

Step 702A: The mobile device 110 sends a pairing request message to the ECU 201 of the electronic device 200.

For example, when a user uses a Bluetooth key of the mobile device for the first time, the user may open a vehicle manufacturer app installed on the mobile device. As shown in b of FIG. 5, the "Bluetooth key" page 511 may further jump to a Bluetooth key setting interface shown in a of FIG. 7C. As shown in a of FIG. 7C, in response to an operation performed by the user on a Bluetooth key pairing control on the Bluetooth key setting interface, the mobile device 110 may display the Bluetooth key pairing setting interface. For example, as shown in b of FIG. 7C, the Bluetooth key pairing setting interface may include a Bluetooth key pairing setting interface of the electronic device 200. The mobile device 110 monitors an input operation of the user. For example, the input operation may be tapping a pairing control. In response to the input operation, the mobile device 110 may determine, when receiving the second message sent by the electronic device 200, the communication module 4 that discovers the electronic device 200. In this case, a pairing request message may be sent to the communication module 4, so that the ECU 201 of the electronic device 200 receives the pairing request message. The pairing request message may include verification information (such as identity information, password information, or other verification information associated with the identity information) of the user and the identifier of the communication module 4.

In a scenario in which an electronic vehicle key may be shared with a plurality of electronic devices, the user may perform operation on a Bluetooth key sharing interface, to authorize to another electronic device (for example, the mobile device 110 is a mobile device of a vehicle owner, the mobile device 110 may authorize the vehicle manufacturer app to the electronic device 300, and the electronic device 300 may be a mobile device used by a relative of the vehicle owner), so that the authorized another electronic device may also initiate a pairing request to the ECU 201 of the vehicle. A plurality of pairings with the electronic device 200 may be managed and displayed by using the Bluetooth key sharing interface. When a control corresponding to the shared Bluetooth key shown in a of FIG. 7C is triggered, the mobile device 110 jumps to a Bluetooth key sharing interface (for example, as shown in c of FIG. 7C), to display all corresponding electronic devices that are connected to the vehicle and that are used as vehicle keys. The user may complete, by using the Bluetooth key sharing interface shown in c of FIG. 7C, operations such as adding an electronic key, deleting an electronic key, or updating an electronic key.

Step 703A: The ECU 201 forwards the pairing request message to a server of the vehicle.

When determining, based on the pairing request message, that the mobile device 110 is legal, the server of the vehicle triggers a pairing process of pairing the mobile device 110 with the electronic device 200.

Step 704A: The server of the vehicle verifies the verification information in response to the pairing request message, and sends a control instruction to the ECU 201 when the verification succeeds.

The control instruction is used to instruct the ECU 201 to control the communication module 4 to send a broadcast signal used for pairing. Optionally, to ensure pairing security, a coverage area of the broadcast signal may be an ultra-short distance (for example, 30 cm).

Step 705A: The ECU 201 generates, in response to the control instruction, security code used for pairing with the mobile device.

In some embodiments, a mode for pairing the mobile device 110 with the electronic device 200 may be a security code connection pairing (LE Secure Connections PassKey Entry) mode. The ECU 201 generates a random number PassKey as security code.

Step 706A: The ECU 201 broadcasts a pairing response message by using the communication module 4, where the pairing response message includes the security code.

To ensure pairing security, after receiving the security code, the communication module 4 adjusts a transmission distance to an ultra-short distance (for example, 30 cm), and broadcasts the security code.

Optionally, after receiving the broadcast signal of the communication module 4, the mobile device 110 may determine the identifier (for example, a medium/media access control (MAC) address) of the communication module 4 based on the broadcast signal, so that a position of the communication module 4 on the vehicle may be displayed on the mobile device 110 based on a preset position of a vehicle in which the communication module 4 is located and the identifier of the communication module 4. As shown in b of FIG. 7C, the received signal of the communication module 4 (for example, a communication module located on a trunk door of the vehicle) may be displayed, so that the user subsequently triggers pairing based on the position of the communication module 4. This avoids a problem that the user may fail to receive a signal of the communication module 4 due to a long distance from the communication module 4.

In some embodiments, a plurality of communication modules (for example, the communication module 1 and the communication module 2 shown in b of FIG. 7C, as well as the communication module 3 and the communication module 4) in the electronic device 200 may not be all enabled, to reduce power consumption of the electronic device 200. In this case, the mobile device 110 may not receive Bluetooth signals transmitted by the communication module 1 to the communication module 4 in the electronic device 200. In this case, the display of the mobile device 110 may display an enabled state of the communication module 1 to the communication module 3 in the electronic device 200, so that the user may move the mobile device 110 into a coverage area of the enabled communication module, and the mobile device 110 can receive Bluetooth signals transmitted by the communication module 1 to the communication module 4 in the electronic device 200. In some other examples, in response to an operation performed by the user on an enabling control of the communication module 1 of the electronic device 200, the electronic device 200 may enable the corresponding communication module 1 to be in a pairing mode (a state of a low transmit antenna and a low transmit power), so that the mobile device 110 can receive a Bluetooth signal transmitted by the communication module 1 of the electronic device 200.

Optionally, the ECU 201 of the electronic device 200 may send a prompt message to the mobile device, to enable the user to successfully receive the security code broadcast by the communication module 1. The prompt message may be displayed on a home screen of the vehicle manufacturer app, or may be displayed on another screen, to prompt the user to be close to a coverage area of the broadcast signal in which the communication module 1 is located, for example, close to a driver's seat. For example, the mobile device 110 approaches the vehicle from a left side of the vehicle from far to near. After entering the coverage area of the broadcast signal of the communication module 1, the mobile device 110 may receive a signal broadcast by the communication module 1, and then obtain, by using the received signal broadcast by the communication module 1, the security code broadcast by the ECU 201.

Step 707A: In response to the pairing response message, the mobile device 110 establishes a secure connection to the electronic device 200 by using the security code.

For example, the mobile device may complete an LE secure connection to the ECU 201. For details, refer to the Bluetooth specification 5.1. Details are not described herein again.

(Refer to https://www.bluetooth.com/specifications/archived-specifications/).

In this case, a pairing status between the mobile device 110 and the electronic device 200 may be displayed on the Bluetooth key pairing setting interface. The communication module 1 and the communication module 2 on the vehicle may be further displayed, and a connection status between the mobile device 110 and the corresponding communication module 1 and whether the communication module 1 on the vehicle is enabled may be further displayed. By controlling the communication module 1, the user may further enable or disable the corresponding communication module 1, so as to improve an effect of personalized customization, and further reduce power consumption of the vehicle.

It should be noted that, after the mobile device establishes the secure connection to the ECU 201, the ECU 201 may store pairing information with the mobile device, where the pairing information may include security code generated by the ECU 201 during the pairing, identity information of the mobile device, and the like, so that when the mobile device initiates pairing to the ECU 201 again, the foregoing process of initiating pairing by using the server does not need to be executed, and the ECU 201 may directly perform pairing based on the stored pairing information of the mobile device, to establish an LE secure connection.

For another example, it is considered that the user may need to replace the electronic device because the electronic device needs to be maintained, and after the maintenance, the user further needs to switch back to the original electronic device, therefore, in a possible scenario, the mobile device 110 may have been successfully paired with the electronic device 200. In this case, when re-initiating a pairing request, the mobile device 110 may not need to initiate a request to the server, and may initiate a pairing request message to the ECU 201, so that the ECU 201 completes pairing with the mobile device based on locally stored pairing information, and enables a Bluetooth key function by the user. Further, the original pairing may be correspondingly deleted. The deletion instruction may be initiated by the user by using the Bluetooth key sharing interface of the vehicle manufacturer app, or may be automatically initiated by the mobile device 110 when it is determined that the existing pairing includes a same account (for example, an account of the vehicle owner or an account of a driver). In all the pairing manners in these scenarios, pairing may be performed based on the pairing information pre-stored in the ECU 201, to improve pairing efficiency.

Figure 7B:
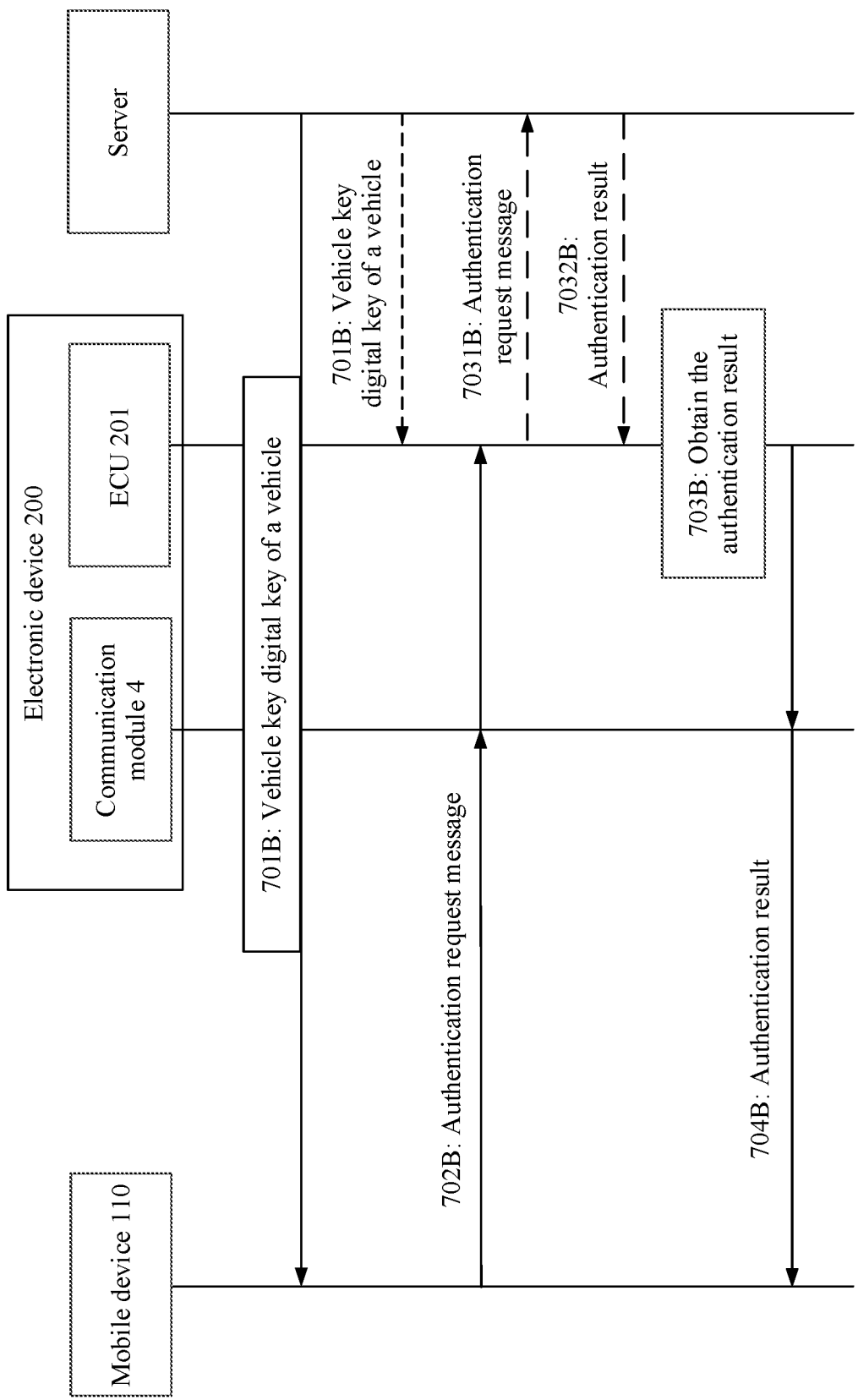
FIG. 7B is a schematic flowchart of steps of performing authentication on a mobile device or an electronic device in a transportation means control method according to an embodiment of this disclosure.
Figure 7C:
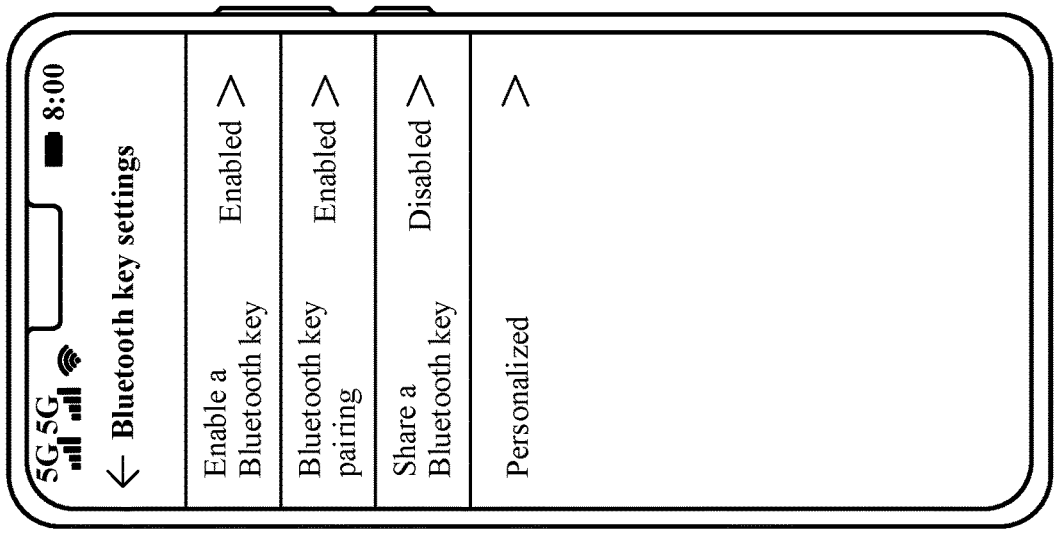
FIG. 7C is a schematic diagram of a user interface of a mobile device in a step of pairing the mobile device with an electronic device in a transportation means control method according to an embodiment of this disclosure.
Figure 7C:
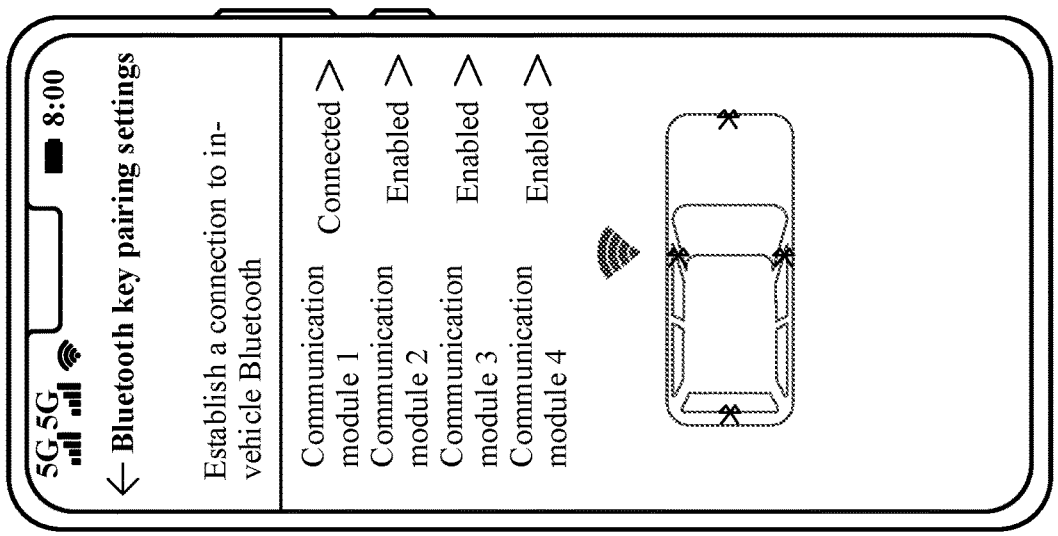
Figure 7C:
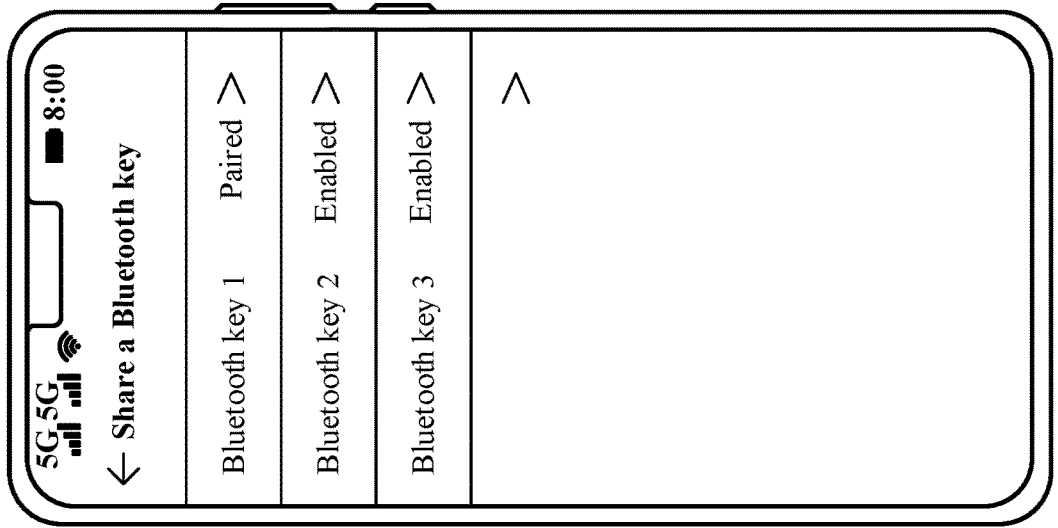

FIG. 7B is a schematic flowchart of steps of performing authentication on a mobile device or an electronic device in a transportation means control method according to an embodiment of this disclosure. Specific steps are included.

Step 701B: The mobile device obtains a digital key of a vehicle key.

A server of a vehicle may configure the digital key of the vehicle key for an authorized user, and send the digital key of the vehicle key to the mobile device in which the authorized user is located, so that authentication is subsequently performed on the digital key of the vehicle key of the mobile device, and the mobile device is determined as the authorized user. For example, the key may be a symmetric key or an asymmetric key. This is not limited herein.

In some embodiments, the digital key of the vehicle key of the vehicle may be sent to the mobile device in advance, or may be configured by the server of the vehicle after the server of the vehicle determines, based on a pairing request message forwarded by the ECU 201 from the mobile device, that a user is the authorized user. This is not limited herein.

Step 702B: The mobile device 110 sends an authentication request message to the ECU 201.

For example, a cipher-based message authentication code CMAC algorithm is used for an authentication method. The mobile device may perform message integrity check calculation on sent communication data by using the digital key of the vehicle key delivered by the server, to obtain authentication information C1, and carry the authentication information C1 in the authentication request to send to the electronic device 200.

Step 703B: The ECU 201 obtains an authentication result of the authentication request.

In a possible implementation, the ECU 201 performs authentication on the authentication request.

Authentication on the mobile device may be performed locally on the vehicle. In this scenario, the server of the vehicle may send the digital key of the vehicle key to the ECU 201 of the vehicle, so that the ECU 201 may perform authentication on the mobile device based on the digital key of the vehicle key sent by the server.

After receiving the authentication request by using the communication module 4, the electronic device 200 may send the authentication request to the ECU 201. After the ECU 201 receives the authentication request, the electronic device 200 may perform CMAC calculation on the received authentication information based on the digital key of the vehicle key from the server to obtain C2, and determine that the mobile device is a mobile device that is successfully authenticated when values of C1 and C2 are consistent.

In another possible implementation, step 7031B: The ECU 201 forwards the authentication request to the server, to obtain an authentication result of the authentication request from the server. For a specific process in which the server authenticates the authentication request, refer to a manner in which the ECU 201 authenticates the authentication request. Details are not described herein again. Step 7032B: Obtain the authentication result of the authentication request from the server.

Step 704B: The ECU 201 sends an authentication response message to the mobile device by using the communication module 4.

When the authentication succeeds, the ECU 201 of the electronic device 200 may send an authentication success message to the mobile device by using the communication module 4. The message may be displayed on a Bluetooth module interface of the mobile device, and is used to prompt the user that a Bluetooth key function is successfully enabled and the Bluetooth key function can be used.

When the authentication fails, the ECU 201 of the electronic device 200 may control the communication module 4 to disconnect a Bluetooth connection to the mobile device, and delete pairing information with the mobile device. In this case, the mobile device may display the message on the Bluetooth module interface of the mobile device based on a state of disconnection from the communication module 4, to prompt the user that the Bluetooth key function fails to be enabled. Further, the user may be prompted to re-initiate pairing, or the user may be prompted to re-install a Bluetooth key.

Figure 8A:
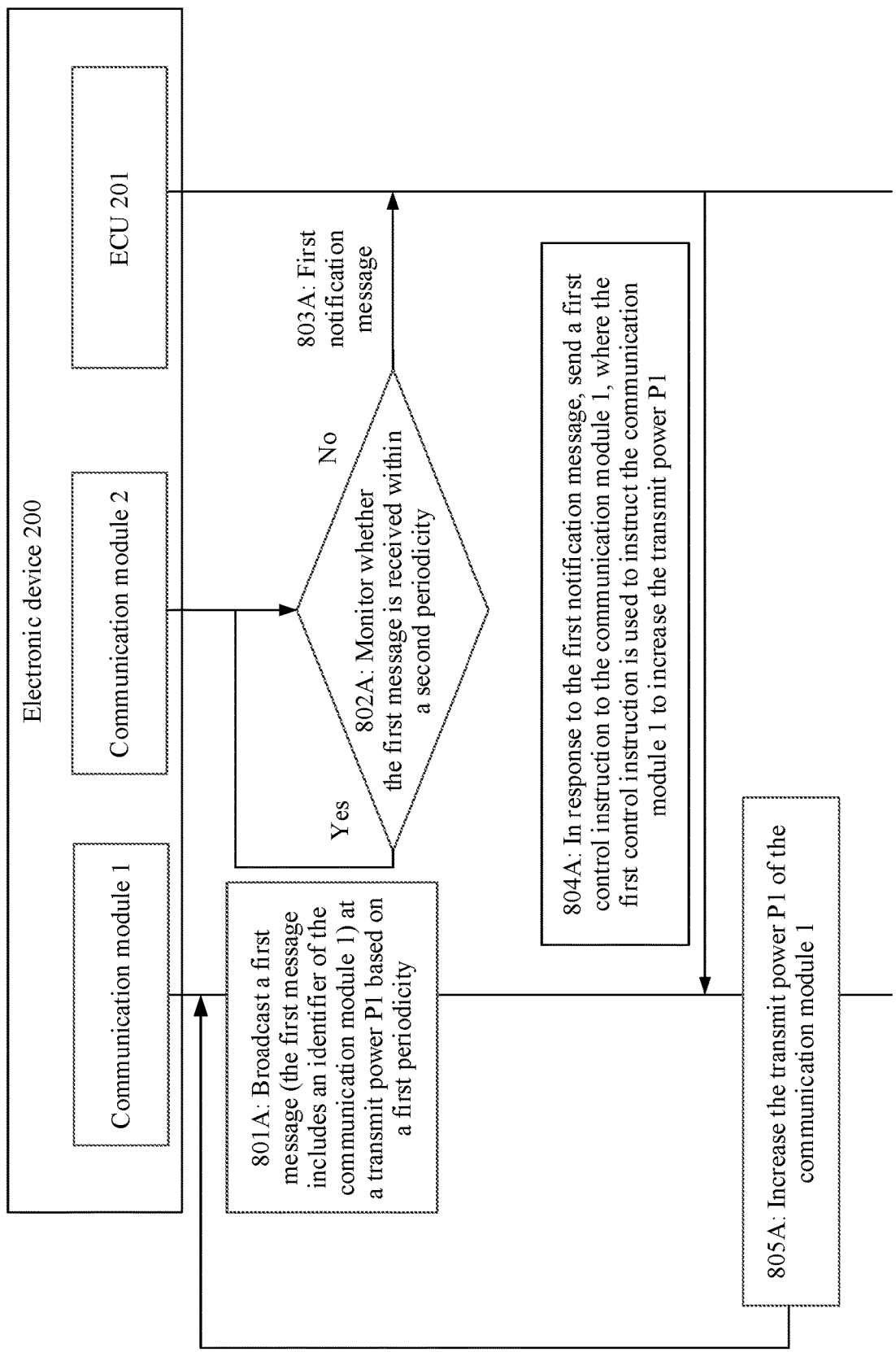
FIG. 8A to FIG. 8C are schematic flowcharts of steps of monitoring and adjusting a transmit power of a communication module in a transportation means control method according to an embodiment of this disclosure.

The following uses an example to describe steps of monitoring and adjusting a transmit power of a communication module in a transportation means control method in this embodiment of this disclosure. FIG. 8A is a schematic flowchart of steps of monitoring and adjusting a transmit power of a communication module in a transportation means control method according to an embodiment of this disclosure. For example, a communication module 2 monitors a signal broadcast by a communication module 1. The communication module 1 is at a first distance from the communication module 2, and the first distance is less than or equal to a security distance for the mobile device to trigger execution of a specific function of a transportation means. For example, if the security distance is 2 meters, the first distance may be set to 2 meters or less than a value of the security distance. The first distance may be a minimum value that meets a security requirement. For example, a coverage area of a signal transmitted by the communication module 1 is a circular coverage area. When a radius of a coverage area of the signal broadcast by the communication module 1 is less than a distance between the communication module 1 and the communication module 2, it is considered that the coverage area of the signal broadcast by the communication module 1 is excessively small. When using a Bluetooth car key, a user needs to be close enough to the communication module 1 to perform the specific function. This reduces user experience. For a manner in which the communication module 1 monitors the signal broadcast by the communication module 2, refer to this manner. Details are not described herein again. Specific steps are included.

Step 801A: The communication module 1 broadcasts a first message at a transmit power P1 based on a first periodicity.

The first message includes an identifier of the communication module 1.

An initial value of the transmit power P1 of the communication module 1 may be a transmit power of the communication module 1 used by the user last time, or may be a default value, which is not limited herein. In some embodiments, after determining that a vehicle has been paired, and authentication succeeds, the ECU 201 may switch the transmit power of the communication module 1 on the vehicle to a default power (the default power may be determined based on statistics of a historical record of the user, or may be set before delivery, or may be determined in another manner, which is not limited herein), and broadcast a specific Bluetooth beacon (Beacon) frame of the communication module 1 based on the first periodicity. Alternatively, the first periodicity may be determined based on a requirement, and is not limited herein.

It should be noted that the ECU 201 may enable a Bluetooth function of the communication module 1 after the user enables a Bluetooth vehicle key function of the vehicle and completes pairing and authentication with the mobile device, to ensure that the Bluetooth vehicle key function is performed without sensing. Further, before performing step 801A, the ECU 201 may transmit a broadcast signal by using another communication module, for example, the communication module 4, to avoid that the communication module 1 and the communication module 2 are in a working state for a long time and power consumption is high. A coverage area of the broadcast signal is large, to ensure that the mobile device and the ECU 201 complete pairing and authentication before entering a security distance. For example, at a long distance (for example, 50 m) between the mobile device and the ECU 201, it is determined, by using a Bluetooth connection request that is sent by the mobile device and that is received by the communication module 4, that the mobile device is near the vehicle. In this way, the ECU 201 may perform pairing and authentication with the mobile device by using the communication module 4. After pairing and authentication between the mobile device and the ECU 201 are completed, step 801A is performed.

Step 802A: The communication module 2 monitors whether the first message is received within a second periodicity. If the first message is received within the second periodicity, perform step 803A; or if the first message is not received within the second periodicity, return to perform step 802A.

The second periodicity is greater than or equal to the first periodicity. The first periodicity and the second periodicity may be preset by the user based on a requirement, or may be preset by a manufacturer based on experience or the like before delivery.

In some embodiments, the second periodicity may be determined based on a scanning periodicity of the communication module 2. For example, the second periodicity may be N scanning periodicities, and the scanning periodicity may be 100 ms. N may be a positive integer. The communication module 2 serves as a listening module of the communication module 1, and scans a specific Beacon frame of the communication module 1 based on the second periodicity. The first periodicity of the communication module 1 and the second periodicity of the communication module 2 may be set based on an actual requirement, so as to quickly complete adjustment of a coverage area of the communication module 1. Before the user reaches a distance of a security requirement, the transmit power of the communication module 1 is adjusted, and the coverage area of the broadcast signal of the communication module 1 meets the security requirement, so that user experience is improved.

In this step, the communication module 2 may re-attempt to scan the specific Beacon frame of the communication module 1, to determine whether the current transmit power of the communication module 1 meets the security requirement. When determining that the specific frame of the communication module 1 can be correctly parsed, the communication module 2 determines that the coverage area of the communication module 1 meets an unlocking security distance, and a power or an antenna level of the communication module 1 does not need to be adjusted.

In another possible implementation, a first notification message sent in step 803A may be used to indicate whether a first notification message of the first message is received within the second periodicity, to avoid a case in which the first message of the communication module 1 cannot be received due to a fault of the communication module 2, so that the ECU 201 determines, based on the received first notification message, whether a transmit power P1 of the communication module 1 needs to be adjusted.

Step 803A: The communication module 2 sends the first notification message to the ECU 201.

The first notification message is used to indicate that the communication module 2 has received the first message of the communication module 1.

When the communication module 2 cannot correctly parse out the specific Beacon frame of the first message within the second periodicity, the communication module 2 may determine that the current transmit power of the communication module 1 is insufficient, and the broadcast coverage area of the first message of the communication module 1 does not meet the security requirement, and may determine to send the first notification message to the ECU 201.

A manner in which the communication module 2 sends the first notification message to the ECU 201 may be sending by using a CAN or a LIN connected to the ECU 201, or may be sending in a wireless manner, or may be forwarding the first notification message to the ECU 201 by using another communication module. This is not limited herein.

Step 804A: The ECU 201 sends a first control instruction to the communication module 1 in response to the first notification message.

Based on the first notification message, the ECU 201 may determine that the communication module 2 does not receive the first message of the communication module 1 within the second periodicity. In other words, it indicates that interference may exist in the signal broadcast by the communication module 1. For example, another vehicle near the left side of the vehicle also enables a Bluetooth module of a same frequency. In this case, an antenna of the communication module 1 is interfered, and the coverage area of the signal broadcast by the communication module 1 is small. In this case, the ECU 201 may determine, based on the received first notification message of the communication module 2, that the transmit power of the communication module 1 is small. In this case, the ECU 201 may send, to the communication module 1, the first control instruction for increasing the transmit power. Optionally, the first control instruction may be used to indicate the communication module 1 to increase to a specific transmit power, or may be a default first control instruction for increasing the transmit power one by one, so as to save signaling overheads.

The ECU 201 may transmit the first control instruction to the communication module 1 by using the communication module 2, or may directly send the first control instruction to the communication module 1. The ECU 201 may send the first control instruction in a wired or wireless manner. This is not limited herein.

Step 805A: The communication module 1 increases the transmit power of the communication module 1 based on the received first control instruction.

For a specific manner of increasing the transmit power of the communication module 1, refer to manners in FIG. 3A and FIG. 3B. Details are not described herein again.

After step 805A is performed, return to step 801A. In this way, the communication module 1 may broadcast the first message based on the adjusted transmit power, so that when a distance between the mobile device and the communication module 1 is less than the distance of the security requirement subsequently, the ECU 201 enables the transportation means to perform a specific function.

According to the foregoing method for adjusting the transmit power of the communication module 1, interference from a signal in an environment to the coverage area of the signal of the communication module 1 can be effectively resisted, so that security and sensitivity of vehicle unlocking through Bluetooth are improved.

When the communication module 1 is interfered, an actual coverage area may not be a circular area, consequently the coverage area is insufficient. In this case, the coverage area of the communication module 1 may be monitored by using a plurality of communication modules, to ensure that the entire coverage area of the communication module 1 of the vehicle meets the security requirement.

For example, the communication module 4 is further disposed on the vehicle. After the signal broadcast by the communication module 1 may be received by using the communication module 2, the communication module 3 monitors the signal broadcast by the communication module 1. When the communication module 4 may also receive the signal broadcast by the communication module 1, it may be considered that the coverage area of the signal broadcast by the communication module 1 meets the requirement. When the communication module 2 can receive the signal broadcast by the communication module 1, but the communication module 4 cannot receive the signal broadcast by the communication module 1, it may be considered that the coverage area of the signal broadcast by the communication module 1 is insufficient, and the transmit power level of the communication module 1 may be increased until both the communication module 2 and the communication module 4 can receive the signal broadcast by the communication module 1. In this case, it is considered that the adjustment is completed. In this way, in a complex environment, the signal coverage area of the communication module 1 can be adaptively maintained, and safe and automatic unlocking can be performed without sensing.

In still another possible scenario, when the vehicle is parked at the rear or 70 cm away from the side of the vehicle, with a wall or another obstruction, a coverage area of a Bluetooth signal at the rear and the side of the vehicle may be maintained to be only 70 cm. The coverage area of the Bluetooth signal of the communication module 1 at the rear and the side of the vehicle does not need to be adjusted to be the same as a coverage area of another communication module 1, so that power consumption is reduced and interference between the communication modules 1 can be further reduced.

In another possible embodiment, for example, in a scenario in which the vehicle is parked at the rear or 70 cm away from the right side of the vehicle, with a wall or another obstruction, the communication module 1 at the rear and the communication module 1 on the right side may not participate in an unlocking process. Therefore, the communication module 1 at the rear and the communication module 1 on the right side may be directly set to a disabled state, to reduce power consumption.

A manner of adjusting an enabled or disabled state of the communication module 1 and adjusting the coverage area of the Bluetooth signal of the communication module 1 based on the scenario may be autonomously adjusted by the vehicle, or may be adjusted by the user on a setting interface based on a user habit or the like. For a specific setting manner, for example, the user may perform setting in an unlocking mode of the setting interface. For details, refer to the following unlocking mode setting. Details are not described herein again.

Figure 8B:
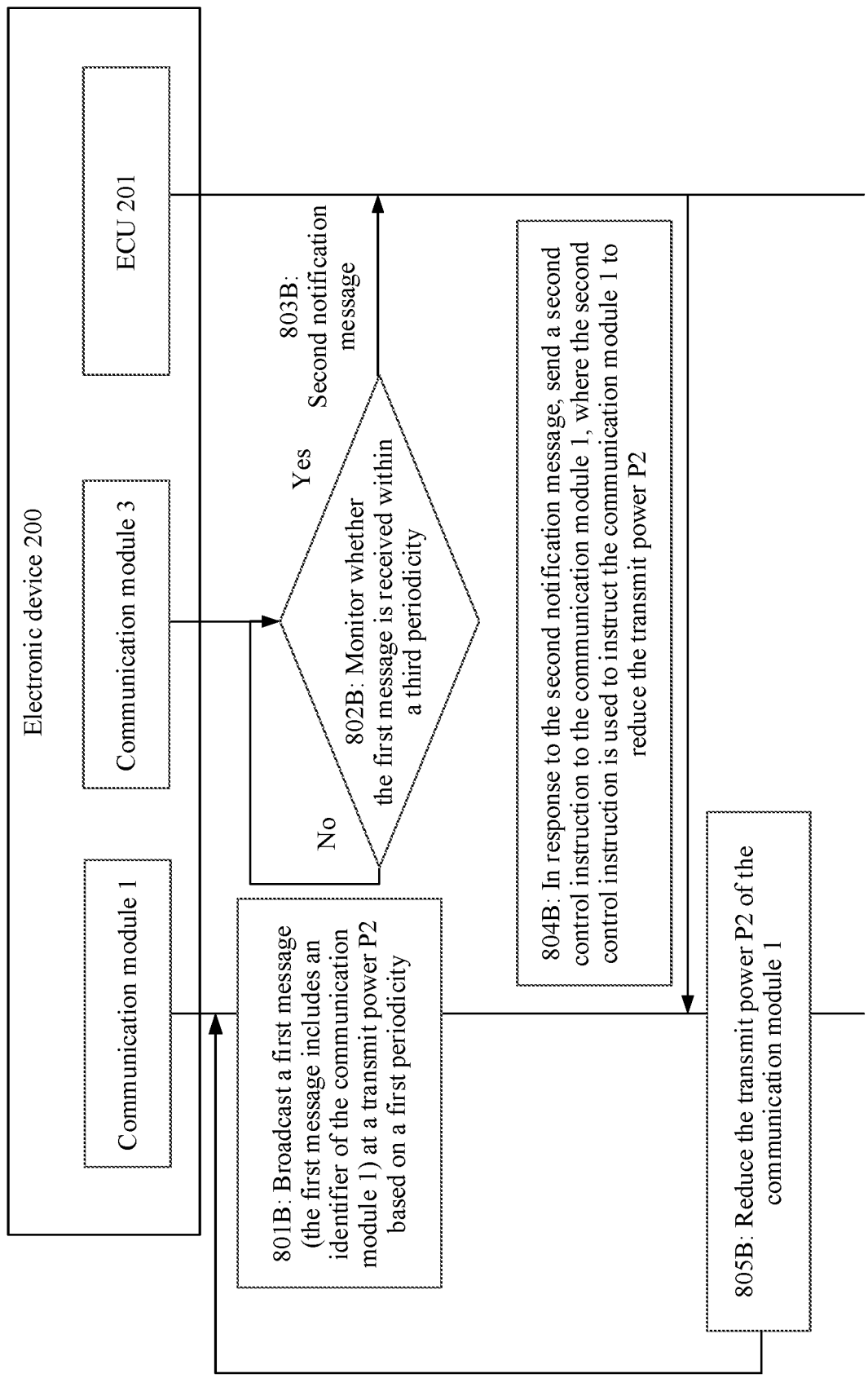

The following uses an example to describe a method for monitoring and adjusting a transmit power of a communication module in this embodiment of this disclosure. FIG. 8B is a schematic flowchart of steps of monitoring and adjusting a transmit power of a communication module in a transportation means control method according to an embodiment of this disclosure. For example, a mobile device is close to a communication module 1. It is considered that a signal broadcast by the communication module 1 may have an interference signal. In this case, in FIG. 8A, when the interference signal exists, a transmit power of the communication module 1 is increased. When the interference signal disappears or the interference signal changes, a coverage area of the signal broadcast by the communication module 1 may be far beyond a distance of a security requirement. Therefore, when approaching the communication module 1, the mobile device may receive the signal broadcast by the communication module 1 before entering the distance of the security requirement. This may cause a security risk. One possible solution is that a communication module 3 may be disposed to monitor the broadcast signal of the communication module 1. The communication module 1 is at a second distance from the communication module 3. The second distance is greater than a security distance of a security condition in which the mobile device triggers execution of a specific function of a transportation means. For example, the security distance is 2 meters, and the second distance may be set to 2.1 meters. That is, the second distance may be set to a maximum value of the distance that meets the security requirement. For example, a maximum value of a radius of the coverage area of the signal broadcast by the communication module 1 is a distance between the communication module 3 and the communication module 1. In this way, the transmit power of the communication module 1 is adjusted by using the communication module 3. Specific steps are included.

Step 801B: The communication module 1 broadcasts a first message at a transmit power P2 based on a first periodicity.

The first message includes an identifier of the communication module 1.

An initial value of the transmit power P2 of the communication module 1 may be a transmit power of the communication module 1 used by the user last time, or may be an adjusted transmit power P1 based on FIG. 8A, or may be a default value, which is not limited herein. For step 801B, refer to step 801A. Details are not described herein again.

Step 802B: The communication module 3 monitors whether the first message is received within a third periodicity. If the first message is received within the third periodicity, perform step 803B; or if the first message is not received within the third periodicity, return to perform step 802B.

The third periodicity is greater than or equal to the first periodicity. The first periodicity and the third periodicity may be preset by the user based on a requirement, or may be preset by a manufacturer based on experience or the like before delivery. The third periodicity may be greater than or equal to the second periodicity. For a specific setting manner, refer to step 802A. Details are not described herein again.

In another possible implementation, a second notification message sent in step 803B may be used to indicate whether a first notification message of the first message is received within the second periodicity, to avoid a case in which the first message of the communication module 1 cannot be received due to a fault of the communication module 3, so that the ECU 201 determines, based on the received second notification message, whether a transmit power P2 of the communication module 1 needs to be adjusted.

Step 803B: The communication module 3 sends the second notification message to the ECU 201. The second notification message is used to indicate that the communication module 2 has received the first message of the communication module 1 within the second periodicity.

In some embodiments, when the communication module 3 correctly parses out a specific Beacon frame of the first message within the second periodicity, the communication module 3 may determine that the current transmit power of the communication module 1 is large, and the broadcast coverage area of the first message of the communication module 1 does not meet the security requirement, and may determine to send the second notification message to the ECU 201.

A manner in which the communication module 3 sends the second notification message to the ECU 201 may be sending by using a CAN or a LIN connected to the ECU 201, or may be sending in a wireless manner, or may be forwarding the second notification message to the ECU 201 by using another communication module. This is not limited herein.

Step 804B: The ECU 201 sends a second control instruction to the communication module 1 in response to the second notification message.

The ECU 201 may determine, based on the received second notification message of the communication module 2, that the coverage area of the signal broadcast by the communication module 1 has reached the maximum value or exceeds the maximum value. That is, when determining that the transmit power of the communication module 1 is large, the ECU 201 may send the second control instruction for reducing the transmit power P2 of the communication module 1 to the communication module 1. Optionally, the second control instruction may be used to indicate the communication module 1 to reduce to a specific transmit power, or may be a default second control instruction for reducing the transmit power one by one, so as to save signaling overheads.

The ECU 201 may transmit the second control instruction to the communication module 1 by using the communication module 3, or may directly send the second control instruction to the communication module 1. The ECU 201 may send the second control instruction in a wired or wireless manner. This is not limited herein.

Step 805B: The communication module 1 reduces the transmit power of the communication module 1 based on the received second control instruction.

For a specific manner of reducing the transmit power of the communication module 1, refer to manners in FIG. 3A and FIG. 3B. Details are not described herein again.

After step 805B is performed, return to step 801B. In this way, the communication module 1 may broadcast the first message based on the adjusted transmit power, so that when a distance between the mobile device and the communication module 1 is less than the distance of the security requirement subsequently, the ECU 201 enables the transportation means to perform a specific function.

In a possible scenario, with reference to the manner in FIG. 8A, a distance between the communication module 2 and the communication module 1 may be set to a minimum value of the distance that meets the security requirement, and a distance between the communication module 3 and the communication module 1 is set to the maximum value of the distance that meets the security requirement, so that in any scenario, the coverage area of the signal broadcast by the communication module 1 may be controlled to be between the maximum value and the minimum value of the security requirement. In this way, the signal coverage area of the communication module 1 can be adaptively maintained in a complex environment, and safe and automatic unlocking is performed without sensing. This improves user experience.

Figure 8C:
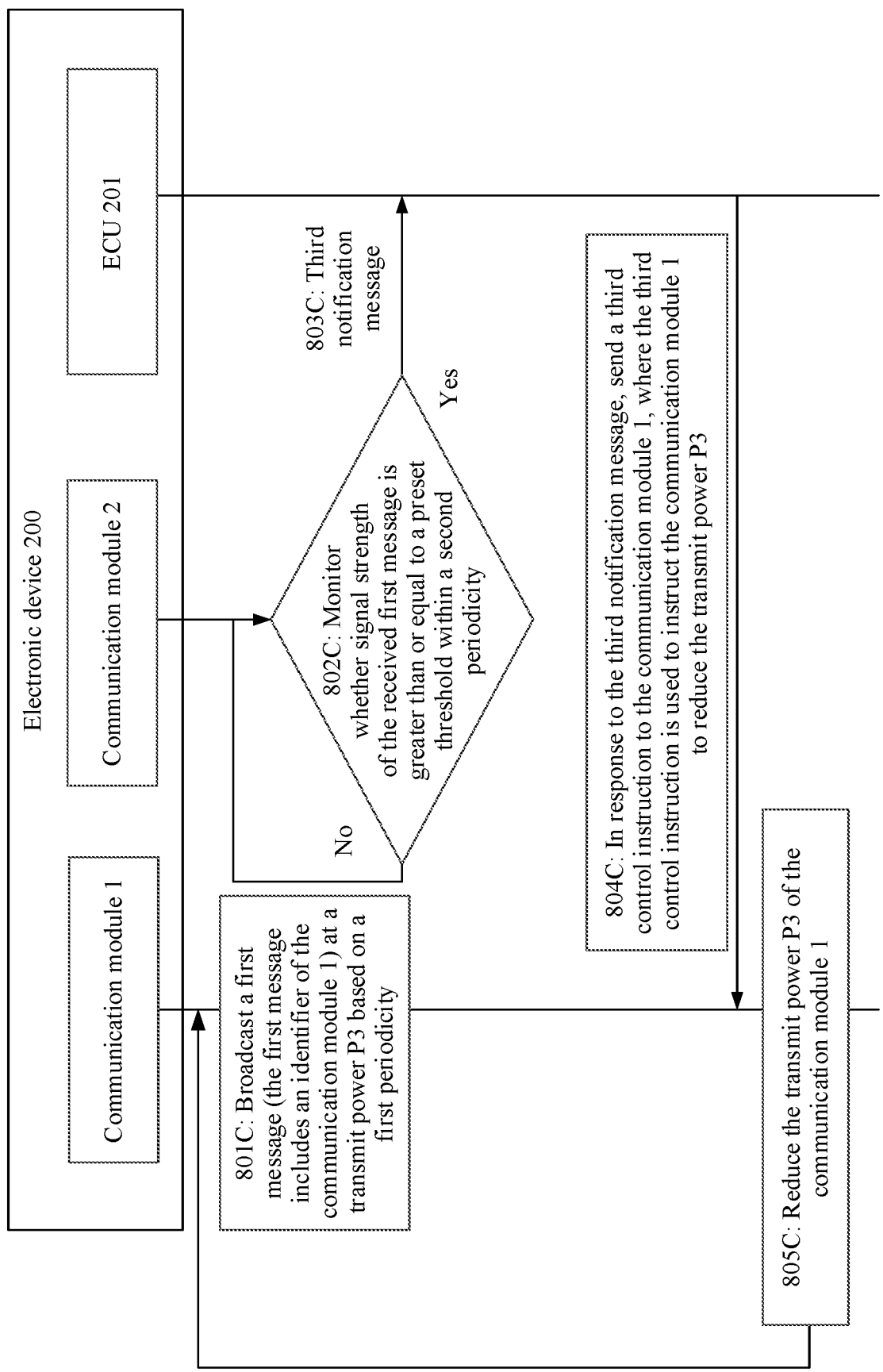

The following uses an example to describe steps of monitoring and adjusting a transmit power of a communication module in a transportation means control method in this embodiment of this disclosure. FIG. 8C is a schematic flowchart of steps of monitoring and adjusting a transmit power of a communication module in a transportation means control method according to an embodiment of this disclosure. Herein, with reference to FIG. 8A, an example in which a communication module 2 monitors a signal broadcast by a communication module 1 is used. As an interference signal may exist in a signal scenario broadcast by the communication module 1, a subsequent scenario in which the interference signal disappears specifically includes the following steps.

Step 801C: The communication module 1 broadcasts a first message at a transmit power P3 based on a first periodicity.

The first message includes an identifier of the communication module 1.

An initial value of the transmit power P3 of the communication module 1 may be a transmit power of the communication module 1 used by the user last time, or may be a transmit power P1, which is not limited herein.

For details, refer to step 801A. Details are not described herein again.

Step 802C: The communication module 2 monitors whether signal strength of the first message received within a second periodicity is less than a preset threshold. If the signal strength of the first message is not less than the preset threshold, perform step 803C; or if the signal strength of the first message is less than the preset threshold, return to perform step 802C.

The second periodicity is greater than or equal to the first periodicity. The first periodicity and the second periodicity are preset by the user based on a requirement, or are preset by a manufacturer based on experience or the like before delivery. For a specific setting manner, refer to step 802A. Details are not described herein again.

It is considered that the interference signal may exist in the signal scenario broadcast by the communication module 1. In this case, with reference to the implementation in FIG. 8A, the transmit power of the communication module 1 may be increased, to ensure that the communication module 2 can receive the signal broadcast by the communication module 1. Further, when the interference signal disappears subsequently, a coverage area of the signal broadcast by the communication module 1 is restored to a range when there is no interference. In this case, the transmit power of the communication module 1 is restored to the transmit power when there is no interference. Therefore, a preset value may be determined based on the signal strength that is broadcast by the communication module 1 and that is received by the communication module 2 when there is no interference in a test scenario. When the communication module 2 monitors the signal strength of the first message received within the second periodicity to be less than the preset value, it is considered that a scenario without interference is not restored currently, and the transmit power of the communication module 1 may be not adjusted. When the communication module 2 monitors the signal strength of the first message received within the second periodicity to be greater than or equal to the preset value, it may be determined that the signal strength broadcast by the communication module 1 is large, and may be restored to a scenario in which there is no interference or interference is weakened, and the transmit power of the communication module 1 needs to be reduced. For example, the transmit power of the communication module 1 may be set to a transmit power that meets the security requirement in the scenario in which there is no interference. Alternatively, the transmit power of the communication module 1 may be adjusted to a lowest transmit power, and the manner in FIG. 8A is performed again.

In another possible manner, the communication module 2 may also monitor whether the signal broadcast by the communication module 1 changes, and determine whether the transmit power of the communication module 1 needs to be adjusted. For example, when it is determined that the change of the signal that is monitored by the communication module 2 and that is broadcast by the communication module 1 is greater than a preset threshold, it is considered that the coverage area of the signal broadcast by the communication module 1 may exceed a security requirement range, and it may be determined that the transmit power of the communication module 1 needs to be adjusted currently. For example, when the strength of the broadcast signal of the communication module 1 increases to be more than a preset maximum threshold, it may be determined that the transmit power of the communication module 1 is large. In this case, the ECU 201 may send, to the communication module 1, a third control instruction for reducing the transmit power. When the strength of the broadcast signal of the communication module 1 is less than a preset minimum threshold, it may be determined that the transmit power of the communication module 1 is small. In this case, the ECU 201 may send, to the communication module 1, a third control instruction for increasing the transmit power.

Step 803C: The communication module 2 sends a third notification message to the ECU 201. The third notification message is used to indicate the communication module 2 to determine that signal strength of the received first message of the communication module 1 is greater than or equal to the preset value.

Step 804C: The ECU 201 sends the third control instruction to the communication module 1 based on the third notification message.

Based on the third notification message, the ECU 201 may determine that signal strength of the first message that is of the communication module 1 and that is received by the communication module 2 within the second periodicity is greater than or equal to the preset value. In other words, it indicates that interference on the signal broadcast by the communication module 1 may have disappeared. In this case, the third control instruction for reducing the transmit power of the communication module 1 may be generated.

The ECU 201 may send the third control instruction to the communication module 1 by using the communication module 3, or may directly send the third control instruction to the communication module 1. The ECU 201 may send the third control instruction in a wired or wireless manner. This is not limited herein.

Step 805C: The communication module 1 adjusts the transmit power of the communication module 1 based on the received third control instruction.

For a specific manner of reducing the transmit power of the communication module 1, refer to manners in FIG. 3A and FIG. 3B. Details are not described herein again.

After step 805C is performed, return to step 801C. In this way, the communication module 1 may broadcast the first message based on the adjusted transmit power, so that when a distance between the mobile device and the communication module 1 is less than the distance of the security requirement subsequently, the ECU 201 enables the transportation means to perform a specific function.

In this way, by using the foregoing method for adjusting the transmit power of the communication module 1, interference from a signal in an environment to a coverage area of the signal of the communication module 1 can be effectively resisted. Especially after the interference disappears, it can be further ensured that the transmit power of the communication module 1 meets the security requirement. This improves security and sensitivity of triggering, by using the mobile device, the transportation means to perform a specific function.

All or some of the foregoing embodiments and implementations of this disclosure may be randomly combined.

Figure 9:
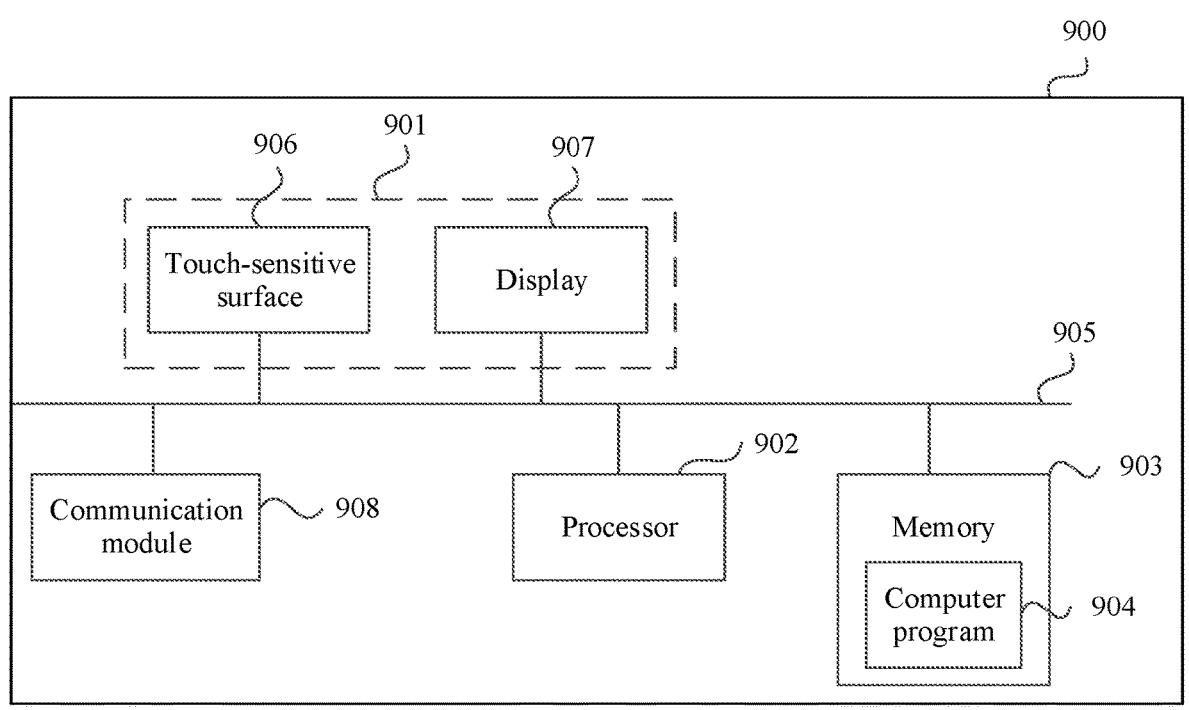
FIG. 9 is a schematic diagram of a structural composition of an electronic device according to an embodiment of this disclosure.

As shown in FIG. 9, some other embodiments of this disclosure disclose an electronic device 900. The electronic device is, for example, a mobile phone or an iPad. The electronic device 900 may include: a touchscreen 901, where the touchscreen 901 includes a touch-sensitive surface 906 and a display 907; one or more processors 902; and a communication module 908. The foregoing components may be connected by using one or more communication buses 905.

The touchscreen 901 may be used as an input device of the electronic device to receive an input operation, for example, monitor an unlocking operation. The display 907 may be used to display a home screen, a display interface of an application, or the like. One or more computer programs 904 are stored in a memory 903 and are configured to be executed by the one or more processors 902. The one or more computer programs 904 include instructions, and the instructions may be used to perform the steps in corresponding embodiments in FIG. 5 and FIG. 6.

For example, if the electronic device 900 is the mobile device 110 in this embodiment of this disclosure, the touchscreen 901 is a display in the mobile device 110, and the communication module 908 may be a mobile communication module and/or a wireless communication module. The processor 902 may be a processor of the mobile device 110, and the memory 903 may be an internal memory of the mobile device 110.

Embodiments of this disclosure further provide a computer storage medium. The computer storage medium stores computer instructions. When the computer instructions are run on an electronic device, the electronic device performs the related method steps, to implement the method in the foregoing embodiments.

An embodiment of this disclosure further provides a computer program product. When the computer program product is run on a computer, the computer is enabled to perform the foregoing related steps to implement the method in the foregoing embodiment.

In addition, an embodiment of this disclosure further provides an apparatus. The apparatus may be specifically a chip system, a component, or a module, and the apparatus may include a processor and a memory that are connected to each other. The memory is configured to store computer-executable instructions. When the apparatus runs, the processor may execute the computer-executable instructions stored in the memory, so that the apparatus performs one or more steps in the foregoing embodiments, to implement the method in the foregoing embodiments.

In addition, an embodiment of this disclosure further provides an apparatus. The apparatus may be specifically a chip system, a component, or a module, and the apparatus may include a processor and a memory that are connected. The memory is configured to store computer-executable instructions. When the apparatus runs, the processor may execute the computer-executable instructions stored in the memory, to enable a chip to perform the methods in the foregoing method embodiments.

The electronic device, the computer storage medium, the computer program product, or the chip provided in embodiments of this disclosure may be all configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this disclosure, it should be understood that the disclosed apparatus and method may be implemented in other manners. For example, the described apparatus embodiment is merely an example. For example, division into modules or units is merely logical function division and may be other division during an actual implementation. For example, a plurality of units or components may be combined or integrated into another apparatus, or some features may be discarded or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this disclosure essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this disclosure. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A transportation device, wherein the transportation devices comprises an electronic device, and the electronic device comprises:
    a processor;
    a memory, wherein the memory is coupled to the processor;
    a first short-distance wireless communication module, wherein the first short-distance wireless communication module is connected to the processor, the first short-distance wireless communication module is fixedly disposed at a first location of the transportation device, and the first short-distance wireless communication module is configured to broadcast a first message at a first transmit power at a first periodicity;
    a second short-distance wireless communication module, wherein the second short-distance wireless communication module is connected to the processor, the second short-distance wireless communication module is fixedly disposed at a second location of the transportation device, the first location and the second location are different locations of the transportation device, the second short-distance wireless communication module is at a first distance from the first short-distance wireless communication module, the second short-distance wireless communication module is configured to listen for the first message at a second periodicity; and
    a computer program, wherein the computer program is stored in the memory, and when the computer program is executed by the processor, the electronic device is enabled to perform the following steps:
    after the second short-distance wireless communication module does not receive the first message within the second periodicity,
        sending, by using the second short-distance wireless communication module, a first notification message to the processor;
        after receiving, by the processor, the first notification message, controlling, by the processor, the first short-distance wireless communication module to increase a transmit power until the second short-distance wireless communication module receives the first message within the second periodicity;
    receiving, by the first short-distance wireless communication module, a first response message of a mobile device; and
    in response to receiving the first response message, controlling, by the processor, the transportation device to perform a specific function, wherein
    the second periodicity is greater than or equal to the first periodicity, and the first response message is a response to the first message from the mobile device.

2. The transportation device of claim 1, wherein the electronic device further comprises a third short-distance wireless communication module fixedly disposed on the transportation device, the first short-distance wireless communication module is at a second distance from the third short-distance wireless communication module, the second distance is greater than the first distance, and before the receiving, by the first short-distance wireless communication module, the first response message of the mobile device, the electronic device is further enabled to perform the following steps:
    after the third short-distance wireless communication module receives the first message within a third periodicity,
        sending, by using the third short-distance wireless communication module, a second notification message to the processor; and
        after receiving, by the processor, the second notification message, controlling, by the processor, the first short-distance wireless communication module to reduce the transmit power until the third short-distance wireless communication module does not receive the first message within the third periodicity, wherein the third periodicity is greater than or equal to the first periodicity.

3. The transportation device of claim 1, wherein before the first short-distance wireless communication module receives the first response message of the mobile device, the electronic device further performs the following steps:

after the second short-distance wireless communication module receives the first message within the second periodicity,
comparing a signal strength of the received first message with a preset signal strength, wherein the preset signal strength is a signal strength of the first message received by the second short-distance wireless communication module when there is no interference and when the first short-distance wireless communication module transmits at the first transmit power;
sending, by the second short-distance wireless communication module, a third notification message to the processor when the signal strength of the received first message is greater than the preset signal strength; and
after receiving the third notification message, controlling, by the processor, the first short-distance wireless communication module to reduce the transmit power until the signal strength of the received first message is equal to or less than the preset signal strength.

4. The transportation device of claim 1, wherein the electronic device further comprises a fourth short-distance wireless communication module, and before the first short-distance wireless communication module broadcasts the first message at the first transmit power based on the first periodicity, the electronic device further performs the following steps:

broadcasting, by using the fourth short-distance wireless communication module, a second message;
receiving a pairing request message of the mobile device; and
in response to receiving the pairing request message, broadcasting, by using the fourth short-distance wireless communication module, a pairing response message to the mobile device, to complete pairing with the mobile device.

5. The transportation device of claim 4, wherein after the electronic device completes the pairing with the mobile device, the electronic device further performs the following steps:

receiving an authentication request message of the mobile device, wherein the authentication request message comprises a digital key, and using the digital key to verify permission of the mobile device to control the transportation device to perform the specific function; and
in response to the verifying permission, broadcasting, by using the fourth short-distance wireless communication module, an authentication response message to the mobile device, to complete authentication on the mobile device.

6. The transportation device of claim 4, wherein a transmit power of the second message broadcasted by the fourth short-distance wireless communication module is greater than a transmit power of the first message broadcasted by the first short-distance wireless communication module, or the fourth short-distance wireless communication module is the first short-distance wireless communication module.

7. The transportation device of claim 4, wherein the first message comprises an identifier of the first short-distance wireless communication module, the second message comprises an identifier of a fourth communication module of the electronic device, the pairing request message comprises verification information of the mobile device and the identifier of the fourth communication module, the pairing response message comprises security code used for pairing with the mobile device and the identifier of the fourth communication module of the electronic device, the first short-distance wireless communication module, the third short-distance wireless communication module, and the fourth communication module establish a connection to the mobile device through any one of wireless fidelity, Wi-Fi, Bluetooth, and ZigBee.

8. A transportation device control method, wherein the transportation device comprises an electronic device, the electronic device comprises: a processor; a memory coupled to the processor; a first short-distance wireless communication module connected to the processor, wherein the first short-distance wireless communication module is fixedly disposed at a first location of the transportation device; and a second short-distance wireless communication module connected to the processor, wherein the second short-distance wireless communication module is fixedly disposed at a second location of the transportation device, the first short-distance wireless communication module is configured to broadcast a first message at a first transmit power based on a first periodicity, the first short-distance wireless communication module is at a first distance from the second short-distance wireless communication module, the second short-distance wireless communication module is configured to listen for the first message at a second periodicity, and the second short-distance wireless communication module is configured to enable to listen for the first message within the second periodicity; and the method comprises:

broadcasting, by the first short-distance wireless communication module, the first message at the first periodicity, wherein the first message comprises an identifier of the first short-distance wireless communication module;
receiving, by the second short-distance wireless communication module, the first message within the second periodicity, wherein the second periodicity is greater than or equal to the first periodicity;
receiving, by the first short-distance wireless communication module, a first response message from the mobile device, wherein the first response message comprises the identifier of the first short-distance wireless communication module; and
in response to receiving the first response message, sending, by the processor, an execution command of a specific function to the transportation device, wherein the execution command is used to indicate the transportation device to perform the specific function;
wherein the receiving, by the second short-distance wireless communication module, the first message within the second periodicity comprises:
after the second short-distance wireless communication module does not receive the first message within the second periodicity, sending, by using the second short-distance wireless communication module, a first notification message to the processor;
after receiving, by the processor, the first notification message, controlling, by the processor, the first short-distance wireless communication module to increase a transmit power until the second short-distance wireless communication module receives the first message within the second periodicity.

9. The transportation device control method of claim 8, wherein the electronic device further comprises a third short-distance wireless communication module fixedly disposed on the transportation device, the first short-distance wireless communication module is at a second distance from the third short-distance wireless communication module, the second distance is greater than the first distance, and before the receiving, by the first short-distance wireless communication module, a first response message from the mobile device, the method further comprises:
   after the third short-distance wireless communication module receives the first message within a third periodicity,
      sending, by using the third short-distance wireless communication module, a second notification message to the processor; and
   after receiving, by the processor, the second notification message, controlling, by the processor, the first short-distance wireless communication module to reduce a transmit power until the third short-distance wireless communication module does not receive the first message within the third periodicity, wherein
   the third periodicity is greater than or equal to the first periodicity.

10. The transportation device control method of claim 8, wherein before the receiving, by the first short-distance wireless communication module, a first response message from the mobile device, the method further comprises:
   after the second short-distance wireless communication module receives the first message within the second periodicity,
      comparing a signal strength of the received first message with a preset signal strength, wherein the preset signal strength is a signal strength of the first message received by the second short-distance wireless communication module when there is no interference and when the first short-distance wireless communication module transmits at the first transmit power;
      sending, by the second short-distance wireless communication module, a third notification message to the processor when the signal strength of the received first message is greater than the preset signal strength; and
   after receiving, by the processor, the third notification message, controlling, by the processor, the first short-distance wireless communication module to reduce the transmit power until the signal strength of the received first message is equal to or less than the preset signal strength.

11. The transportation device control method of claim 8, wherein the electronic device further comprises a fourth short-distance wireless communication module, and before the broadcasting, by the first short-distance wireless communication module, the first message at the first transmit power based on the first periodicity, the method further comprises:
   broadcasting, by using the fourth short-distance wireless communication module, a second message;
   receiving a pairing request message of the mobile device; and
   in response to receiving the pairing request message, broadcasting, by using the fourth short-distance wireless communication module, a pairing response message to the mobile device, to complete pairing with the mobile device.

12. The transportation device control method of claim 11, wherein after the electronic device completes the pairing with the mobile device, the method further comprises:
   receiving an authentication request message of the mobile device, wherein the authentication request message comprises a digital key, and using the digital key to verify permission of the mobile device to control the transportation device to perform the specific function; and
   in response to the verifying permission, broadcasting, by using the fourth short-distance wireless communication module, an authentication response message to the mobile device, to complete authentication on the mobile device.

13. The transportation device control method of claim 11, wherein a transmit power of the second message broadcasted by the fourth short-distance wireless communication module is greater than a transmit power of the first message broadcasted by the first short-distance wireless communication module, or the fourth short-distance wireless communication module is the first short-distance wireless communication module.

14. A non-transitory computer-readable storage medium comprising a computer program, wherein the computer program is configured to operate an electronic device in a transportation device, the electronic device comprises: a processor; a first short-distance wireless communication module connected to the processor, wherein the first short-distance wireless communication module is fixedly disposed on a first location of the transportation device; and a second short-distance wireless communication module connected to the processor, wherein the second short-distance wireless communication module is fixedly disposed on a second location of the transportation device, the first short-distance wireless communication module broadcasts a first message at a first transmit power at a first periodicity, the second short-distance wireless communication module is at a first distance from the first short-distance wireless communication module, the second short-distance wireless communication module is configured to listen for the first message at a second periodicity, and the second short-distance wireless communication module is configured to enable to listen for the first 12message within the second periodicity; and when the computer program is run on the electronic device, the electronic device is enabled to perform: broadcasting, by the first short-distance wireless communication module, the first message at the first periodicity, wherein the first message comprises an identifier of the first short-distance wireless communication module; receiving, by the second short-distance wireless communication module, the first message within the second periodicity, wherein the second periodicity is greater than or equal to the first periodicity; receiving, by the first short-distance wireless communication module, a first response message from the mobile device, wherein the first response message comprises the identifier of the first short-distance wireless communication module; and in response to receiving the first response message, sending, by the processor, an execution command of a specific function to the transportation device, wherein the execution command is used to indicate the transportation device to perform the specific function; wherein the receiving, by the second short-distance wireless communication module, the first message within the second periodicity comprises: after the second short-distance wireless communication module does not receive the first message within the second periodicity, sending, by using the second short-distance wireless communication module, a first notification message to the processor; after receiving, by the processor, the first notification message, controlling, by the processor, the first short-distance wireless communication module to increase a transmit power until the second short-distance wireless communication module receives the first message within the second periodicity.

15. A non-transitory computer-readable storage medium of claim 14, wherein the electronic device further comprises a third short-distance wireless communication module fixedly disposed on the transportation device, the third short-distance wireless communication module is at a second distance from the first short-distance wireless communication module, the second distance is greater than the first distance, wherein before the receiving, by the first short-distance wireless communication module, a first response message from the mobile device, the electronic device is enabled to perform: after the third short-distance wireless communication module receives the first message within a third periodicity, sending, by using the third short-distance wireless communication module, a second notification message to the processor; and after receiving, by the processor, the second notification message, controlling, by the processor, the first short-distance wireless communication module to reduce a transmit power until the third short-distance wireless communication module does not receive the first message within the third periodicity, wherein the third periodicity is greater than or equal to the first periodicity.

16. The non-transitory computer-readable storage medium of claim 14, wherein before the receiving, by the first short-distance wireless communication module, a first response message from the mobile device, the electronic device is enabled to perform: after the second short-distance wireless communication module receives the first message within the second periodicity, comparing signal strength of the received first message with preset signal strength, wherein the preset signal strength is signal strength of the first message received by the second short-distance wireless communication module when there is no interference and when the first short-distance wireless communication module transmits at the first transmit power; sending, by the second short-distance wireless communication module, a third notification message to the processor after the signal strength of the received first message is greater than the preset signal strength; and after receiving, by the processor, the third notification message, controlling, by the processor, the first short-distance wireless communication module to reduce the transmit power until the signal strength of the received first message is equal to the preset signal strength.

17. The non-transitory computer-readable storage medium of claim 14, wherein the electronic device further comprises a fourth short-distance wireless communication module, and before the broadcasting, by the first short-distance wireless communication module, the first message at the first transmit power based on the first periodicity, the electronic device is enabled to perform: broadcasting, by using the fourth short-distance wireless communication module, a second message; receiving a pairing request message of the mobile device; and in response to receiving the pairing request message, broadcasting, by using the fourth short-distance wireless communication module, a pairing response message to the mobile device, to complete pairing with the mobile device.

18. The non-transitory computer-readable storage medium of claim 17, wherein after the electronic device completes the pairing with the mobile device, the electronic device is enabled to perform: receiving an authentication request message of the mobile device, wherein the authentication request message comprises a digital key, and the digital key is used to verify permission of the mobile device to control the transportation device to perform the specific function; and in response to receiving the authentication request message, broadcasting, by using the fourth short-distance wireless communication module, an authentication response message to the mobile device, to complete authentication on the mobile device.

19. The non-transitory computer-readable storage medium of claim 17, wherein a distance of the second message broadcasted by the fourth short-distance wireless communication module is greater than a distance of the first message broadcasted by the first short-distance wireless communication module, or the fourth short-distance wireless communication module is the first short-distance wireless communication module.

* * * * *